(12) United States Patent
Gao et al.

(10) Patent No.: US 10,445,650 B2
(45) Date of Patent: Oct. 15, 2019

(54) TRAINING AND OPERATING MULTI-LAYER COMPUTATIONAL MODELS

(71) Applicant: Microsoft Technology Licensing, LLC, Redmond, WA (US)

(72) Inventors: Jianfeng Gao, Woodinville, WA (US); Li Deng, Redmond, WA (US); Xiaodong He, Sammamish, WA (US); Lin Xiao, Bellevue, WA (US); Xinying Song, Bellevue, WA (US); Yelong Shen, Bothell, WA (US); Ji He, Jiangsu (CN); Jianshu Chen, Redmond, WA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 996 days.

(21) Appl. No.: 14/949,156

(22) Filed: Nov. 23, 2015

(65) Prior Publication Data
US 2017/0147942 A1    May 25, 2017

(51) Int. Cl.
G06N 7/00    (2006.01)

(52) U.S. Cl.
CPC .................................. G06N 7/005 (2013.01)

(58) Field of Classification Search
CPC ...................................................... G06F 17/30
USPC ........................................................ 706/20
See application file for complete search history.

(56) References Cited

U.S. PATENT DOCUMENTS

| | | | |
|---|---|---|---|
| 8,484,228 B2 | 7/2013 | Bhattacharyya et al. | |
| 8,589,434 B2 | 11/2013 | Liebald et al. | |
| 8,682,918 B2 | 3/2014 | Ramanujam | |
| 2006/0179051 A1* | 8/2006 | Whitney | G06F 16/3347 |
| 2012/0203584 A1 | 8/2012 | Mishor et al. | |

(Continued)

FOREIGN PATENT DOCUMENTS

CN    101620692    1/2010

OTHER PUBLICATIONS

Andrzejewski, D.M., "Incorporating Domain Knowledge in Latent Topic Models," Doctoral Dissertation on Computer Sciences, University of Wisconsin, Madison, May 22, 2011, cover page and pp. iv-vi, xiii, 1-14, 86-127.

(Continued)

*Primary Examiner* — Robert A Cassity
*Assistant Examiner* — Peter D Coughlan
(74) *Attorney, Agent, or Firm* — Schwegman Lundberg & Woessner, P.A.

(57) ABSTRACT

A processing unit can successively operate layers of a multilayer computational graph (MCG) according to a forward computational order to determine a topic value associated with a document based at least in part on content values associated with the document. The processing unit can successively determine, according to a reverse computational order, layer-specific deviation values associated with the layers based at least in part on the topic value, the content values, and a characteristic value associated with the document. The processing unit can determine a model adjustment value based at least in part on the layer-specific deviation values. The processing unit can modify at least one parameter associated with the MCG based at least in part on the model adjustment value. The MCG can be operated to provide a result characteristic value associated with test content values of a test document.

17 Claims, 8 Drawing Sheets

(56) References Cited

U.S. PATENT DOCUMENTS

| | | | |
|---|---|---|---|
| 2014/0059054 A1* | 2/2014 | Liu | G06F 16/36 707/742 |
| 2014/0195298 A1 | 7/2014 | Sri et al. | |
| 2014/0278379 A1* | 9/2014 | Coccaro | G10L 15/1822 704/202 |
| 2014/0278771 A1 | 9/2014 | Rehman et al. | |
| 2014/0279618 A1 | 9/2014 | Li et al. | |
| 2015/0154305 A1* | 6/2015 | Lightner | G06F 16/3347 707/726 |

OTHER PUBLICATIONS

Beck, et al., "Mirror Descent and Nonlinear Projected Subgradient Methods for Convex Optimization," Operations Research Letters, vol. 31, Issue 3, May, 2003, pp. 167-175.

Bishop, et al., "Generative or Discriminative? Getting the Best of Both Worlds," Proceedings of Bayesian Statistics, vol. 8, Jan. 2007, pp. 3-24.

Blei, et al., "Latent dirichlet allocation," Journal of Machine Learning Research, vol. 3, Mar. 1, 2003, pp. 993-1022.

Blei, et al., "Supervised Topic Models," Proceedings of Advances in Neural Information Processing Systems, vol. 20, Dec. 3, 2007, pp. 1-8.

Blitzer, et al., "Biographies, Bollywood, Boom-boxes and Blenders: Domain Adaptation for Sentiment Classification," Proceedings of 45th Annual Meeting of the Association of Computational Linguistics, Jun. 2007, 8 pages.

Bouchard, et al., "The Tradeoff between Generative and Discriminative Classifiers," Proceedings of 16th IASC International Symposium on Computational Statistics, Aug. 2004, pp. 1-9.

Chen, et al., "End-to-End Learning of LDA by Mirror-Descent Back Propagation Over a Deep Architecture," Microsoft Research, 19 pages.

Chen, et al., "End-to-End Learning of Latent Dirichlet Allocation by Mirro-Descent Back Propagation," Microsoft Research-NeXT, 20 pages.

Duchi, et al., "Adaptive Subgradient Methods for Online Learning and Stochastic Optimization," Journal of Machine Learning Research, vol. 12, Jul. 2011, pp. 2121-2159.

Griffiths, et al., "Finding Scientific Topics," Proceedings of the National Academy of Sciences of United States of America, vol. 101, Apr. 6, 2004, pp. 5228-5235.

Hershey, et al., "Deep Unfolding: Model-Based Inspiration of Novel Deep Architectures," Proceedings of the Computing Research Repository, Sep. 2014, pp. 1-27.

Hinton, et al., "Discovering Binary Codes for Documents by Learning Deep Generative Models," Topics in Cognitive Science, vol. 3, Issue 1, Aug. 2010, pp. 74-91.

Holub, et al., "A Discriminative Framework for Modelling Object Classes," Proceedings of IEEE Computer Society Conference on Computer Vision and Pattern Recognition, vol. 1, Jun. 20, 2005, 8 pages.

Johnson, S., "Win Loss Analysis: It's Not Just for Sales Any More," retrieved on Aug. 31, 2015, at <<http://www.primary-intel.com/resources/ebooks/win-loss-analysis-not-just-for-sales/>>.

Kapadia, S., "Discriminative Training of Hidden Markov Models", Doctoral Dissertation, Mar. 18, 1988, 97 pages.

Lacoste-Julien, et al., "DiscLDA: Discriminative Learning for Dimensionality Reduction and Classification," Proceedings of the Twenty-Second Annual Conference on Neural Information Processing Systems, Dec. 8, 2008, pp. 1-8.

Lasserre, et al., "Principled Hybrids of Generative and Discriminative Models," Proceedings of IEEE Computer Society Conference on Computer Vision and Pattern Recognition, Jun. 17, 2006, 8 pages.

McAuley, et al., "From Amateurs to Connoisseurs: Modeling the Evolution of User Expertise Through Online Reviews," Proceedings of the 22nd International Conference on World Wide Web, May 13, 2013, pp. 897-908.

McCallum, A.K., "MALLET: A Machine Learning for Language Toolkit," retrieved on Sep. 3, 2015, at <<http://mallet.cs.umass.edu/>>.

Nemirovsky, et al., "Problem Complexity and Method Efficiency in Optimization," Publication of John Wiley & Sons Ltd, Apr. 13, 1983, 2 pages.

Reddy, et al., "Classification and Prediction in Customer Relationship Management Using Back Propagation," International Journal of Computer Science and Informatics, vol. 2, Issue 3, Retrieved on: Aug. 31, 2015, pp. 85-90.

Sontag, et al., "Complexity of Inference in Latent Dirichlet Allocation," Proceedings NIPS, 2011, pp. 1008-1016.

Stoyanov, et al., "Empirical Risk Minimization of Graphical Model Parameters Given Approximate Inference, Decoding, and Model Structure," Proceedings of the 14th International Conference on Artificial Intelligence and Statistics, Apr. 11, 2011, pp. 725-733.

"The Mirror Descent Algorithm", Retrieved on: Aug. 31, 2015 Available at: http://www.stats.ox.as.uk/~lienart/blog_opti_mda.html.

Tkachenko, Y., "Autonomous CRM Control via CLV Approximation with Deep Reinforcement Learning in Discrete and Continuous Action Space," Proceedings of Computing Research Repository, Apr. 8, 2015, pp. 1-13.

Tseng, P., "On Accelerated Proximal Gradient Methods for Convex-Concave Optimization," SIAM Journal on Optimization, May 21, 2008, 20 pages.

Wang, et al., "Spectral Methods for Supervised Topic Models", Advances in Neural Information Processing Systems, Dec. 8, 2014, 9 pages.

Yakhnenko, et al., "Discriminatively Trained Markov Model for Sequence Classification", Proceedings of Fifth IEEE International Conference on Data Mining, Nov. 27, 2005, 8 pages.

Zhu, et al., "Gibbs Max-Margin Topic Models with Data Augmentation", Journal of Machine Learning Research Archive, vol. 15, Issue 1, Jan. 2014, pp. 1073-1110.

Zhu, et al., "MedLDA: Maximum Margin Supervised Topic Models for Regression and Classification", Proceedings of the 26th Annual International Conference on Machine, Jun. 14, 2009, pp. 1257-1264.

Zhu, et al., "MedLDA: Maximum Margin Supervised Topic Models", Journal of Machine Learning Research Archive, vol. 13 Issue 1, Jan. 2012, pp. 2237-2278.

* cited by examiner

TRAINING AND OPERATING MULTI-LAYER COMPUTATIONAL MODELS

BACKGROUND

Computational models such as Dirichlet-multinomial classification models or Bayesian networks are useful for a range of problems. For example, some modeling techniques use such computational models for classifying documents based on the contents or meanings of text strings in those documents. Such models are often trained using a corpus of documents with known classes, and can thus outperform techniques based on predetermined keyword lists or other naive classifiers. However, conventional computational models are limited in the accuracy with which they can represent training data, and thus are limited in the accuracy with which they can classify documents.

SUMMARY

This disclosure describes systems, methods, and computer-readable media for training computational models such as latent Dirichlet models or multilayer computational graphs and for using the trained computational models in, e.g., classifying documents. In some examples, a computing device can successively operate layers of a multilayer computational graph according to a forward computational order to determine a topic value associated with a first document of a plurality of documents based at least in part on content values associated with the first document. The computing device can successively determine, according to a reverse computational order, layer-specific deviation values associated with individual layers of the multilayer computational graph based at least in part on the topic value, the content values, and a characteristic value associated with the first document. The computing device can determine a model adjustment value based at least in part on the layer-specific deviation values. The computing device can modify at least one parameter associated with the multilayer computational graph based at least in part on the model adjustment value. According to example techniques described herein, the computing device can operate the multilayer computational graph to provide a result characteristic value associated with a test document based at least in part on test content values associated with the test document.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
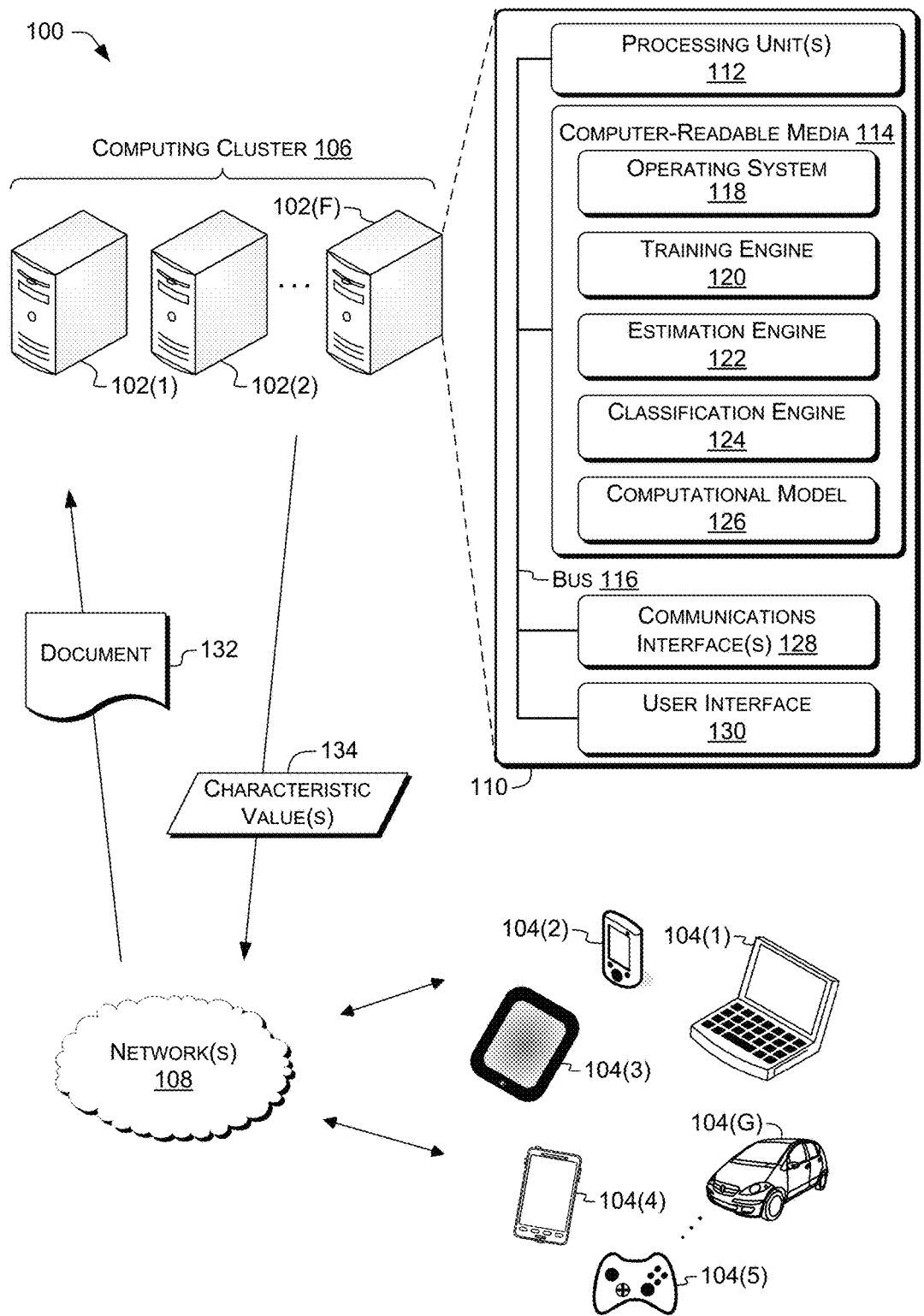
FIG. 1 is a block diagram depicting an example environment for implementing training and operation of computational models as described herein.

Examples described herein provide techniques and constructs to improve the training and operation of computational models, e.g., modified Latent Dirichlet Allocation (LDA) models having multiple processing layers, by traversing the layers in forward and reverse computational orders to determine model adjustment values. This permits training and operating multilayer models with more efficient usage of processing units. Some example computational models herein are referred to as "multilayer computational graphs" (MCGs) and are not constrained to tree or directed-acyclic dataflows. Some examples permit determining multiple internal model parameters based on training data, providing higher classification accuracy. Some examples permit determining which model inputs are generally correlated with particular model outputs. The terms "forward" and "reverse" in reference to computational orders are used for clarity of explanation and do not constrain the order of processing except as expressly indicated below.

Some examples use processing units provisioned as part of a cluster computing systems ("computing cluster" or "cluster") having several discrete computing nodes that work together to accomplish a computing task assigned to the cluster as a whole. Some such systems can have all, or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, or other programmatically-controlled operations. The term "resource" used with reference to clusters, nodes, and jobs refers generally to any commodity or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space or mounting/unmounting services, electrical power, etc.

The techniques described herein may include the use of an algorithm to parallelize the training of an MCG across multiple processing units, e.g., cores of a multi-core processor or multiple general-purpose graphics processing units (GPGPUs). For example, MCGs can be trained using mini-batch-based stochastic descent techniques, e.g., stochastic gradient descent or stochastic mirror descent, and mini-batches can be run in parallel on different processing units.

In some examples, algorithms for MCG training as described herein can be performed on a computing device, such as a smart phone, a tablet, a desktop computer, a server, a server blade, a supercomputer, etc. The resulting MCGs can be used on such computing devices. The resulting MCGs can additionally or alternatively be used on computing devices having one or more input devices, such as a physical keyboard, a soft keyboard, a touch screen, a touch pad, microphone(s), or camera(s) to provide device optimized functions such as document classification. As used herein, a "characteristic value" is the output of a classifier or regressor, or another value representative of or associated with the document. Examples of characteristic values are described below.

Various environments, configurations of electronic devices, and methods for training MCGs and using MCGs, e.g., for classification applications, are described further with reference to FIGS. 1-8. While many examples described herein relate to servers and other non-consumer electronic devices, other types of electronic devices can be used, e.g., as discussed with reference to FIG. 1.

Illustrative Environment

FIG. 1 shows an example environment 100 in which examples of computational model training systems, e.g., multilayer computational graph (MCG) training systems, can operate or in which MCG training or use methods such as those described herein can be performed. In the illustrated example, the various devices and/or components of environment 100 include computing device(s) 102(1)-102(F) (individually or collectively referred to herein with reference 102), where F is any integer greater than or equal to 1, e.g., distributed computing resource(s), and computing devices 104(1)-104(G) (individually or collectively referred to herein with reference 104), where G is any integer greater than or equal to 1. In some examples, F=G; in other examples, F>G or F<G. Although illustrated as, e.g., desktop computers, laptop computers, tablet computers, or cellular phones, computing device(s) 102 or 104 can include a diverse variety of device categories, classes, or types and are not limited to a particular type of device. In the illustrated example, computing device(s) 102(1)-102(F) can be computing nodes in a computing cluster 106, e.g., a cloud service such as MICROSOFT AZURE. In the illustrated example, computing device(s) 104 can be clients of cluster 106 and can submit jobs to cluster 106 and/or receive job results from cluster 106. Computing devices 102(1)-102(F) in cluster 106 can, e.g., share resources, balance load, increase performance, or provide fail-over support or redundancy. Computing devices 104 can additionally or alternatively operate in a cluster or grouped configuration.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices and other satellite-based navigation system devices, personal data assistants (PDAs), and other specialized portable electronic devices (e.g., 104(2)), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles (e.g., 104(G), represented graphically as an automobile), desktop computers, or integrated components for inclusion in computing devices, appliances, or other computing device(s) configured to participate in or carry out MCG training or operation as described herein, e.g., for classification or ranking purposes. In some examples, as indicated, computing device(s), e.g., computing devices 102(1) and 104(1), can intercommunicate to participate in or carry out MCG training or operation as described herein. For example, computing device 104(1) can be a data source and computing device 102(1) can be an MCG training system, as described below with reference to, e.g., FIGS. 2-8.

Different devices or types of computing devices 104 can have different needs or ways of interacting with cluster 106. For example, computing devices 104 can interact with cluster 106 with discrete request/response communications, e.g., for data classification or analysis using an already-trained MCG. Additionally or alternatively, computing devices 104 can be data sources and can interact with cluster 106 with discrete or ongoing transmissions of documents or contents thereof to be used as input to a computational model. Additionally or alternatively, computing devices 104 can be data sinks and can interact with cluster 106 with discrete or ongoing requests for data output, e.g., document classifications from a computational model.

In some examples, computing devices 102 or 104 can communicate with each other or with other computing devices via one or more network(s) 108. In some examples, computing devices 102 and 104 can communicate with external devices via network(s) 108. For example, network(s) 108 can include public networks such as the Internet, private networks such as an institutional or personal intranet, or combination(s) of private and public networks. Private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Network(s) 108 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Different networks have different characteristics, e.g., bandwidth, latency, accessibility (e.g., open, announced but secured, or not announced), or coverage area. The type of network 108 used for any given connection between, e.g., a computing device 104 and cluster 106 can be selected based on these characteristics and on the type of interaction. For example, an example data source can be the "firehose" provided by the TWITTER micro-blogging system. The TWITTER firehose is a real-time feed of all messages sent by users via TWITTER. A feed from the TWITTER firehose can be carried via high-bandwidth, low-latency networks. By contrast, low-bandwidth networks can be used to carry data such as emails or forum posts from individual users to a support service.

Details of an example computing device 102(F) are illustrated at inset 110. The details of example computing device 102(F) can be representative of others of computing device(s) 102 or 104. However, each of the computing device(s) 102 can include additional or alternative hardware and/or software components. Still referring to the example of FIG. 1, computing device 102(2) can include one or more processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, any variety of local, peripheral, or independent buses, or any combination thereof. In some examples, plural processing units 112 can exchange data via an internal interface bus (e.g., PCIe), rather than or in addition to via network 108. While the processing units 112 are described as residing on the computing device 102(F), in this example, the processing units 112 can also reside on different computing device(s) 102 or 104 in some examples. In some examples, at least two of the processing units 112 can reside on different computing device(s) 102 or 104. In such examples, multiple processing units 112 on the same computing device 102 or 104 can use a bus 116 of the computing device 102 or 104 to exchange data, while processing units 112 on different computing device(s) 102 or 104 can exchange data via network(s) 108.

Computer-readable media described herein, e.g., computer-readable media 114, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally or alternatively store instructions executable by external processing units such as by an external central processing unit (CPU) or external processor of any type discussed herein. In some examples at least one processing unit 112, e.g., a CPU, graphics processing unit (GPU), or hardware logic device, can be incorporated in computing device 102, while in some examples at least one processing unit 112, e.g., one or more of a CPU, GPU, or hardware logic device, can be external to computing device 102.

Computer-readable media 114 can store, for example, computer-executable instructions (e.g., computer program instructions or computer-readable instructions) of an operating system 118, module(s) of a training engine 120, module(s) of an estimation engine 122, a classification engine 124, and/or other modules, programs, or applications that are loadable and executable by processing unit(s) 112. In some examples not shown, one or more of the processing unit(s) 112 in one of the computing device(s) 102 or 104 can be operably connected to computer-readable media 114 in a different one of the computing device(s) 102 or 104, e.g., via communications interface and network 108. For example, program code to perform steps of flow diagrams herein, e.g., to interact with training engine 120, can be downloaded from a server, e.g., computing device 102(1), to a client, e.g., computing device 104(G), e.g., via the network 108, and executed by one or more processing unit(s) in computing device 104(G). For example, the computer-executable instructions stored on the computer-readable media 114 can upon execution configure a computer such as a computing device 102 or 104 to perform operations described herein with reference to the operating system 118, the training engine 120, the estimation engine 122, or the classification engine 124.

Computer-readable media 114 can also store, for example, a computational model 126. The computational model 126 can include, e.g., an MCG. The computational model 126 can include, e.g., multiple layers and corresponding parameters. Some examples are described below with reference to FIGS. 3 and 4, e.g., the U and Φ matrices referenced in Tables 1, 2, and 3. The training engine 120 can determine values of parameters of the computational model 126. The estimation engine 122 or classification engine 124 can use the computational model 126 programmed with the determined parameter values to perform, e.g., classification, ranking, or other data analysis.

In some examples, the estimation engine 122 or the classification engine 124 can be configured to communicate with computing device(s) 102 to operate an MCG or other computational model 126. For example, the estimation engine 122 or the classification engine 124 on computing device 104 can transmit a request to computing device(s) 102 for an output of the computational model 126, receive a response, and present the response to a user. In some examples, the functions of training engine 120, estimation engine 122, or classification engine 124 can be shared between one or more computing device(s) 102 and one or more computing device(s) 104. For example, the computing device(s) 104 can operate some layers of an MCG and the computing device(s) 102 can operate other layers of the MCG.

Processing unit(s) 112 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units 112 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 112 can represent a hybrid device, such as a device from ALTERA or XILINX that includes a CPU core embedded in an FPGA fabric. These or other hardware logic components can operate independently or, in some instances, can be driven by a CPU. In some examples, at least some of computing device(s) 102 or 104 can include a plurality of processing units 112 of multiple types. For example, the processing units 112 in computing device 102(F) can be a combination of one or more GPGPUs and one or more FPGAs. Different processing units 112 can have different execution models, e.g., as is the case for graphics processing units (GPUs) and central processing unit (CPUs).

Computing device 102 can also include one or more communications interfaces 128 connected via the bus 116 to processing units 112 to enable wired or wireless communications between computing device(s) 102 and other networked computing devices 102 or 104 involved in cluster computing, or other computing device(s), via network(s) 108. Such communications interface(s) 128 can include one or more transceiver devices, e.g., network interface controllers (NICs) such as Ethernet NICs or other types of transceiver devices, to send and receive communications over a network. The processing units 112 can exchange data through respective communications interface(s) 128. In some examples, the communications interface 128 can be a PCI Express (PCIe) transceiver, and the network 108 can be a PCIe bus. In some examples, the communications interface 128 can include, but is not limited to, a transceiver for cellular (3G, 4G, or other), WI-FI, Ultra-wideband (UWB), BLUETOOTH, or satellite transmissions. The communications interface 128 can include a wired I/O interface, such as an Ethernet interface, a serial interface, a Universal Serial Bus (USB) interface, an INFINIBAND interface, or other wired interfaces. For simplicity, these and other components are omitted from inset 110.

Computer-readable media 114 of the computing device 102 can store an operating system 118. In some examples, operating system 118 is not used (commonly referred to as a "bare metal" configuration). In some examples, operating system 118 can include components that enable or direct the computing device 102 to receive data via various inputs (e.g., user controls, network or communications interfaces, memory devices, or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., a data analyst, to interact with the computing device 102(F) using a user interface. Additionally, the operating system 118 can include components that perform various functions generally associated with an operating system, e.g., storage management and internal-device management.

In some examples, computing device 102 can include a user interface 130 configured to permit a user, e.g., a data analyst or neural-network administrator, to operate the training engine 120, the estimation engine 122, or the classification engine 124, or to inspect the computational model 126. Some examples of user interface 130 are discussed below. In some examples, user interface 130 can permit a user to control or otherwise interact with cluster 106 or computing devices 102 therein. For example, processing unit(s) 112 of a computing device 104 can receive inputs of user actions via user interface 130 and transmit corresponding data via communications interface(s) 128 to computing device(s) 102.

User interface 130 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like. User interface 130 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like.

In the illustrated example, computing device 104 provides a document 132 to computing device 102, e.g., in cluster 106, via network 108. In the illustrated example, computing device 102 responds with one or more characteristic value(s) 134 of document 132, as described below.

Document 132 can be one of a plurality of documents (not shown), e.g., of training data, validation data, or test data. Document 132, can be a physical or electronic document having any type of content. Document 132 can include, e.g., structured data or automated messages provided by a computing device 102 or 104, or unstructured data such as free-form user text written by a user of computing device 104 or another entity. In some examples, document 132 can include text (e.g., structured or unstructured text), images, audio, and so on. Users can provide documents such as document 132, e.g., during the course of use of a hardware or software product or service, or upon request, e.g., from computing device 102 or 104 or a software program running thereon. In some examples, documents such as document 132 can be provided automatically, e.g., under programmatic control, by computing devices 102 or 104. Document 132 can include one or more content values, e.g., field values in the document 132.

In some examples, the content values can include values associated with identifying information. The identifying information can include, e.g., a field name, a search key, or a retrieval key. For example, a document 132 can include a record in a relational database. The content values can be values stored in the fields of the record. Each content value can be associated with the name of the corresponding column of the record. In another example, a document 132 can include an Extensible Markup Language (XML) document. Each element in the XML document can be associated with the XPath path to that element. For example, one or more words in the first paragraph of an example Web page can be associated with the XPath "/html/body/p".

Additionally or alternatively, in some examples, the content values can include values without associated identifying information. For example, a document 132 can include a plain-text file including words of the lyrics of a song, stored as free-form text. Those words can be stored without specific identification that they are lyrics.

In some examples, content values in document 132 can include one or more of the following: text from electronic messages such as emails; user feedback collected by an operating system (OS) or OS component, e.g., through feedback dialogs in MICROSOFT WINDOWS or OS X; text from blog articles or microblog posts, social networking sites, websites, online product reviews, or other online communications or magazine articles; blog comments; responses to questionnaires, surveys, or review forms; whole or partial transcripts, or agent notes, of conversations between a user and employees of a service provider, e.g., sales personnel or customer-service agents, or of conversations between the user and intelligent software personal assistants; text from instant messages such as via the Short Message Service (SMS) or AOL INSTANT MESSENGER (AIM); text from instant-messaging (IM) logs; user-initiated feedback (UIF) collected by systems such as WINDOWS 10, APPLE OS X, etc.; user comments provided in trouble documents or crash reports; or text provided via customer support portals, e.g., online portals, such as those included in or associated with MICROSOFT OFFICE 365, MICROSOFT AZURE, GOOGLE DOCS, or other tools.

In some examples, document 132 can include one or more content values such as an identifier (e.g., a unique identifier such as a globally-unique identifier, GUID) of the document 132, creation or modification dates of document 132, identification of users who created or edited the document 132, indications of a type of computing device 102 or 104 the user was using at the time the document 132 was created, free-form user text, or answers to structured questions such as survey questions or form fields. In some examples, the free-form user text or the answers to structured questions can include, e.g., technical or business information, e.g., physical locations or addresses of parties related to or described in the document 132.

A particular document of the one or more documents, e.g., document 132, can be associated with one or more characteristic values 134. Characteristic values 134 can include discrete values, e.g., for classification, or continuous values, e.g., for regression. In some examples, the characteristic values 134 can represent, e.g., semantic categories of document 132. For example, for documents 132 including posts to an online forum, the content values can include words or phrases in posts and the characteristic values 134 can indicate whether a particular post, e.g., states a problem, provides a solution, comments on a solution, or exhibits "trolling" or other deviations from social norms of the forum. Additionally or alternative, the characteristic values 134 associated with a particular post (document 132) can indicate a feeling or attitude expressed by the author of that particular post. For documents 132 indicating contents or attributes of sales calls, the content values can include attributes of the seller, prospective buyer, or offer, and a characteristic value 134 can indicate whether the sales call was successful at closing the sale. For documents including data from weather sensors, e.g., temperature or humidity sensors, the content values can indicate sensor readings, and a characteristic value 134 can indicate a weather forecast (e.g., whiteouts, extreme cold, Arctic airmasses, thunderstorms, hail, excessive heat, or rain) for a given time period, and multiple characteristic values associated with a particular document can indicate weather forecasts for respective, different forecast periods (e.g., successive days of a five- or seven-day forecast period).

In some examples, training data can include one or more documents 132 and associated characteristic values 134 used to train (determine parameters of) the computational model 126 as described below. Validation data can include one or more documents 132 and associated characteristic values 134 used to test the performance of a trained computational model 126. Test data can include documents 132 for which characteristic values are not known in advance. The trained (or trained and validated) computational model 126 can be used to determine characteristic values 134 for documents 132 in the test data.

Illustrative Components

Figure 2:
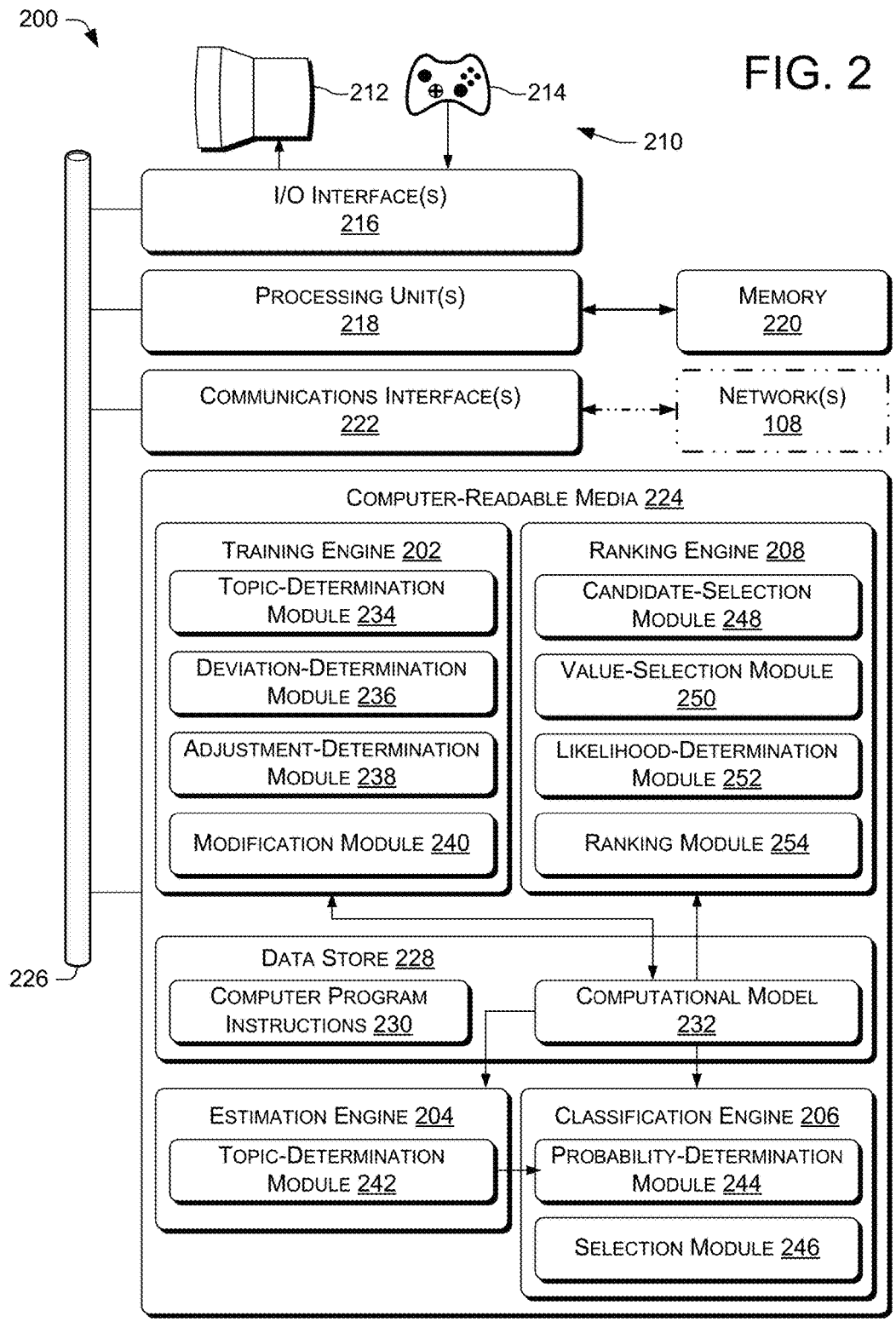
FIG. 2 is a block diagram depicting an example computing device configured to participate in training and operation of computational models according to various examples described herein.

FIG. 2 is an illustrative diagram that shows example components of an computing device 200, which can represent computing device(s) 102 or 104, and which can be or implement an MCG training or operation system, device, or apparatus, according to various examples described herein. Computing device 200 can implement a training engine 202, which can represent training engine 120, FIG. 1. Computing device 200 can implement an estimation engine 204, which can represent estimation engine 122, FIG. 1. Computing device 200 can implement a classification engine 206, which can represent classification engine 124, FIG. 1. Computing device 200 can implement a ranking engine 208. Computing device 200 can include or be included in a system or device for training or operating an MCG or other computational model 126 as described herein.

Computing device 200 can include or be connected to a user interface 210, which can represent user interface 130. In some examples, computing device 200 can be communicatively connected with a user interface 130, FIG. 1, of another computing device. User interface 210 can include a display 212. Display 212 can include an organic light-emitting-diode (OLED) display, a liquid-crystal display (LCD), a cathode-ray tube (CRT), or another type of visual display. Display 212 can be a component of a touchscreen, or can include a touchscreen. User interface 210 can include various types of output devices described above with reference to user interface 130. User interface 210 can include a user-operable input device 214 (graphically represented as a gamepad). User-operable input device 214 can include various types of input devices described above with reference to user interface 130.

Computing device 200 can further include one or more input/output (I/O) interface(s) 216 to allow computing device 200 to communicate with input, output, or I/O devices (for clarity, some not depicted). Examples of such devices can include components of user interface 210 such as user-operable input devices 214 and output devices 212. Other examples of such devices can include power meters, accelerometers, and other devices for measuring properties of computing device 200 or its environment or of another computing device 102 or 104. Computing device 200 can communicate via I/O interface 216 with suitable devices or using suitable electronic/software interaction methods. Input data, e.g., of user inputs on user-operable input device 214, can be received via I/O interface(s) 216, and output data, e.g., of user interface screens, can be provided via I/O interface(s) 216 to display 212, e.g., for viewing by a user.

The computing device 200 can include one or more processing unit(s) 218, which can represent processing unit(s) 112. In some examples, processing unit(s) 218 can include or be connected to a memory 220, e.g., a RAM or cache. Processing units 218 can additionally or alternatively be operably coupled to the I/O interface 216. Processing unit(s) 218 can include, e.g., processing unit types described above such as CPU- or GPGPU-type processing unit(s).

The computing device 200 can also include a communications interface 222, which can represent communications interface 128. For example, communications interface 222 can include a transceiver device such as a network interface controller (NIC) to send and receive communications over a network 108 (shown in phantom), e.g., as discussed above. As such, the computing device 200 can have network capabilities. For example, the computing device 200 can exchange data with computing devices 102 or 104 (e.g., laptops, computers, and/or servers) via one or more network(s) 108, such as the Internet. In some examples, computing device 200 can receive data, e.g., documents 132 or characteristic values 134, from one or more data source(s) (not shown) via one or more network(s) 108. Example data source(s) can include computing devices 102 or 104, sensors, data aggregators, or data feeds, e.g., via application programming interfaces (APIs). The processing units 218 can retrieve data from the data source(s), e.g., via an HTTP request such as a GET to a Web Services or Representational State Transfer (REST) API endpoint.

In some examples, the processing unit(s) 218 are communicatively connected to at least one computer-readable media 224, discussed below. In some examples, the processing unit(s) 218 can access module(s) on the computer-readable media 224 via a bus 226, which can represent bus 116, FIG. 1. I/O interface 216 and communications interface 222 can also communicate with processing unit(s) 218 via bus 226.

In some examples, computer-readable media 224 of the computing device 200 can represent computer-readable media 114, FIG. 1, and can store a plurality of modules of the training engine 202, the estimation engine 204, the classification engine 206, or the ranking engine 208. Computer-readable media 224 can be computer storage media, as discussed above. Processing unit(s) 218 can be configured to execute modules of the plurality of modules. For example, the computer-executable instructions stored on the computer-readable media 224 can upon execution configure a computer such as a computing device 200 to perform operations described herein with reference to the modules of the plurality of modules. The modules stored in the computer-readable media 224 can include instructions that, when executed by the one or more processing units 218, cause the one or more processing units 218 to perform operations described below. In some examples, computer-readable media 224 have thereon computer-executable instructions 230 (described below), the computer-executable instructions 230 upon execution configuring a computer (e.g., computing device 200) to perform operations described herein. Examples of modules in computer-readable media 224 are discussed below. Computer-readable media 224 can also include an operating system, e.g., operating system 118, FIG. 1.

In the illustrated example, computer-readable media 224 includes a data store 228. In some examples, data store 228 can include data storage, structured or unstructured, such as a database (e.g., a Structured Query Language, SQL, or NoSQL database), coefficient table, or data warehouse. In some examples, data store 228 can include a corpus or a relational database with one or more tables, arrays, indices, stored procedures, and so forth to enable data access. Data store 228 can store data for the operations of processes, applications, components, or modules stored in computer-readable media 224 or computer instructions in those modules executed by processing unit(s) 218. In some examples, the data store can store computer-executable instructions 230 (e.g., instructions corresponding to processes described herein or to other software executable by processing unit(s) 218); computational model 232, which can represent computational model 126, FIG. 1; data, e.g., datasets, to be used for training or operation of the computational model 232; metadata, e.g., of documents, database schema(s); or any combination thereof. In some examples, computational model 232 can include model parameters, as discussed below.

The modules of the training engine 202 stored on computer-readable media 224 can include one or more modules or application programming interfaces (APIs), which are illustrated as a topic-determination module 234, a deviation-determination module 236, an adjustment-determination module 238, and a modification module 240.

The modules of the estimation engine 204 stored on computer-readable media 224 can include one or more modules or APIs, which are illustrated as a topic-determination module 242.

The modules of the classification engine 206 stored on computer-readable media 224 can include one or more modules or APIs, which are illustrated as a probability-determination module 244 and a selection module 246.

The modules of the ranking engine 208 stored on computer-readable media 224 can include one or more modules or APIs, which are illustrated as a candidate-selection module 248, a value-selection module 250, a likelihood-determination module 252, and a ranking module 254.

In the training engine 202, the estimation engine 204, or the classification engine 206, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the topic-determination module 234 of the training engine 202 and the topic-determination module 242 of the estimation engine 204 can be combined in a single module, accessible to both the training engine 202 and the estimation engine 204, that performs at least some of the example functions described below of those modules. In some examples, computer-readable media 224 can include a subset of the illustrated modules. Examples of functions performed by modules stored in computer-readable media 224 are discussed below, e.g., with reference to FIGS. 3 and 4.

Figure 3:
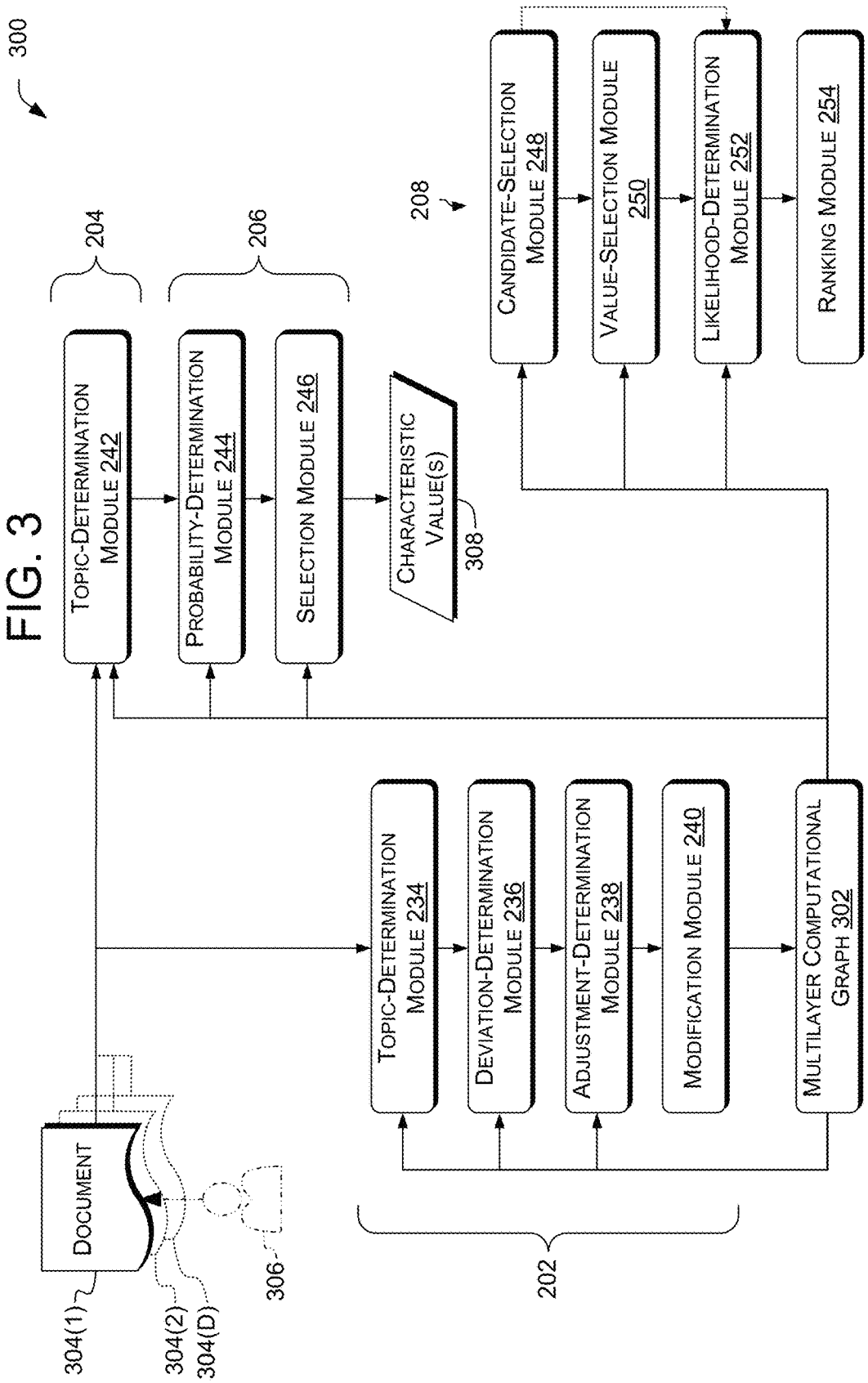
FIG. 3 is a dataflow diagram depicting example module interactions during training and operation of a computational model.

FIG. 3 is a dataflow diagram 300 illustrating example interactions between the modules illustrated in FIG. 2. Various examples include performing supervised learning to train an MCG 302, which can represent computational model 126 or 232. The training can be performed, e.g., using one or more of documents 304(1)-304(D) (individually or collectively referred to herein with reference 304), where D is any integer greater than or equal to 1. Documents 304 can represent document 132, FIG. 1, and can be provided by a user 306 or another entity. Various examples include using the trained MCG 302 to classify one or more documents 304 (or other documents not shown, and likewise throughout) or otherwise determine characteristic values 308 of the documents 304. Training algorithms can be executed, e.g., on a user's local computer or in a cluster 106. For clarity of explanation, this figure is described with reference to a multilayer computational graph. However, other types of computational models 126 or 232 can additionally or alternatively be used with techniques described herein.

Throughout this discussion, various operations are described as being performed on various items. Any of the described operations can be performed on other items in addition to any specifically-identified items or other items in any given group of items. For example, some configurations herein include determining topic values for documents and then determining layer-specific deviation values for the documents. Layer-specific deviation values can be determined for all, or fewer than all, of the documents for which topic values were determined. Other example configurations herein include determining model adjustment values based at least in part on the layer-specific deviation values. The model adjustment values can be determined based at least in part on the layer-specific deviation values determined for all of the documents or for only some of the documents. These examples are not limiting.

In some examples, the topic-determination module 234 of the estimation engine 204 can be configured to successively operate layers of the MCG 302 to determine a topic value, e.g., one or more topic values, associated with a document 304. The layers can be operated according to a first computational order, e.g., a forward computational order.

Topic values can be determined for one or more of documents 304(1)-304(D), and likewise throughout. For example, the topic-determination module 234 can be configured to successively operate the layers of the multilayer computational graph according to the first computational order to determine a first topic value for a first document 304(1) of the plurality of documents based at least in part on first content values associated with the first document 304(1), or a second topic value for a second document 304(2) of the plurality of documents based at least in part on second content values associated with the second document 304(2).

Topic values can be determined, e.g., via maximum a posteriori (MAP) estimation techniques, e.g., as discussed below with reference to Table 1. In some examples, the topic-determination module 234 can determine the topic value based at least in part on content values of document 304, e.g., structured data, text, or other types of information described above. As used herein, $w_{d,n}$ refers to the $n^{th}$ content value in document d. For example, n can range from 1 to the number N of content values in document d. Each content value $w_{d,n}$ can be associated with an element index v in a vocabulary A ($\exists v: w_{d,n}=A_v$). Also as used herein, $x_d$ refers to a term-frequency ("bag of words" or "BoW") vector for document d. The $x_d$ vector can be determined from $w_{d,n}$: the $i^{th}$ element of $x_d$ holds the number of times a particular content value $A_i$ occurs in document d, as in Eq. (1):

$$x_d(i) = \sum_{n=1}^{N} [w_{d,n} = A_i] \qquad (1)$$

In some examples, the document 304 can include one or more named fields. Individual ones (individual content values) of the content values can include values of the named fields. As discussed above, individual content value(s) can be associated with one or more of the named fields. For example, as discussed above, document 304 can include a row of a database table and the content values can include values stored in that row. In some examples, document 304 can include free-form user text and the individual ones of the content values can include words or phrases in the free-form user text.

In some examples, two content values have different indices v in vocabulary A, e.g., are considered to be distinct, if the values themselves are different from each other or if the values are associated with respective, different identifying information. Difference of values or identifying information can be tested, e.g., with or without regard to case, normalization, or collating sequence. For example, in the Extensible Hypertext Markup Language (XHTML) document "<html><body><p>Mike</p><p>Mike</p></body></html>", the two occurrences of "Mike" can have a shared index v in the vocabulary, since they have equal values under string comparison. Alternatively, the two occurrences of "Mike" can be associated with respective, different XPaths, and so can have respective, different indices v. For example, representing vocabulary entries as "key=>value," $A_1$ can be equal to "/html/body/p[1]/text( )=>Mike", and $A_2$ can be equal to "/html/body/p[2]/text( )=>Mike".

In some examples, the topic value can represent a subject of the document 304. For example, a topic value can represent a subject of the document 304, such as a person, place, or thing discussed (or referenced, and likewise throughout) in document 304. A topic value can represent a class of item discussed in document 304. For example, the topic value can indicate that a country is discussed in document 304 without necessarily indicating which country. For any particular document 304, one or more topic values can be determined representing respective topics. In some examples, a topic value can correspond to a group of content values that tend to occur together in multiple documents in a training set. Accordingly, topic values may, but need not, have or express a particular meaning to a user.

As used herein, $\theta_d$ represents a vector of one or more topic values for document d. In some examples, $\theta_d$ is a K×1 vector distributed as a Dirichlet distribution with concentration parameters $\alpha=(\alpha_1, \ldots, \alpha_K)$ for topics 1-K. If document d does not relate to a particular topic, the corresponding element of $\theta_d$ for that topic can be at or near zero.

In some examples, the topic values can be determined, for a particular document 304, layer by layer of the MCG 302 in the first (e.g., forward) computational order. Given an MCG 302 with layers 1-L (e.g., 2≤L≤10 or 2≤L), the topic values can be computed, e.g., as shown in Table 1.

TABLE 1

1. Set $\theta_{d,0} = \frac{1}{K}$ and $T_{d,0} = 1$ 2. for $\ell = 1, \ldots, L$:
3.    $T_d \ell = T_d \ell / \eta$, where $0 < \eta < 1$ (e.g., $\eta = 0.5$)
4.    loop
5.      $\theta_{d,\ell} = \frac{1}{C_\theta} \cdot \Xi_{d,\ell-1}$ $$\Xi_{d,\ell} = \theta_{d,\ell-1} \odot \exp\left(T_{d,\ell}\left[\Phi^T \frac{x_d}{\Phi\theta_{d,\ell-1}} + \frac{\alpha - \mathbb{1}}{\theta_{d,\ell-1}}\right]\right)$$

6.      if $f(\theta_{d,\ell}) > f(\theta_{d,\ell-1}) +$ $$[\nabla_{\theta_d} f(\theta_{d,\ell-1})]^T (\theta_{d,\ell} - \theta_{d,\ell-1}) + \frac{1}{T_{d,\ell}} \Psi(\theta_{d,\ell}, \theta_{d,\ell-1})\text{ then}$$

7.         $T_d \ell \leftarrow \eta \cdot T_d \ell$
8.      else
9.         exit loop
10.      endif
11.    next
12. next $\ell$ In Table 1, $\mathbb{1}$ represents an appropriately-sized vector in which all elements are unity (1). $\Phi$ is a matrix mapping topics to words in those topics, and can have dimension V×K. In some examples, each element of $\Phi$ can be initialized to a random (or pseudorandom, and likewise throughout) value between 0 and 1. In some examples, each element of $\Phi$ can then be incremented by a positive value, e.g., 0.01, 0.1, or 1, so that each element is greater than zero. In other examples, each element of $\Phi$ can be initialized to a random value greater than zero. After populating each element of $\Phi$ with a positive value, $\Phi$ can be normalized along each column so that each column adds up to unity. $C_\theta$ is a normalization factor selected so that the elements of $\theta_{d,l}$ sum to unity for any particular l. In some examples of Line 5 of Table 1, the $\Xi_{d,l-1}$ values can be computed for each d. $C_\theta$ can then be computed by summing the $\Xi_{d,l-1}$ values. The $\theta_{d,l-1}$ values can then be computed as $\theta_{d,l} = \Xi_{d,l-1}/C_\theta$. $\alpha$ is a hyperparameter of a modeled Dirichlet distribution of topics $\theta_d$. The $\odot$ operator denotes the Hadamard product. The division operations in line 5 are element-wise. $T_{d,0}$ is a hyperparameter that can be set to 1.0 (as in Table 1) or another value. $\Psi$ is a distance function, e.g., a squared vector 1-norm such as that in Eq. (2):

$$\Psi(\theta_{d,l}, \theta_{d,l-1}) = \|\theta_{d,l} - \theta_{d,l-1}\|_1^2 \quad (2)$$

In some examples, the hyperparameter $\alpha$ can be tuned during the training process using a holdout validation set. A model's prediction accuracy can be tested on the validation set for various values of $\alpha$. In some examples, $\alpha$ can be, e.g., 1.01, 1.001, 0.1, 0.5, or another value less than 1.0, less than 0.5, or less than 0.1.

The loop from 1 to L corresponds to the forward computational order. Line 5 determines the topic value $\theta_{d,l}$ for each layer l>0 based on the topic value $\theta_{d,l-1}$ of the previous layer. The $T_{d,l}$ values are step sizes in an adaptive line search process. In some examples, lines 3 and 7 are omitted, and a constant step size T is used. In some examples, the function $f(\theta_d)$ in Table 1, line 6, is an objective function as in Eq. (3):

$$f(\theta_d) = -x_d^T \ln(\Phi\theta_d) - (\alpha - \mathbb{1})^T \ln \theta_d \quad (3)$$

The algorithm illustrated in Table 1 is an example of a mirror-descent algorithm (MDA) configured to perform maximum a posteriori (MAP) inference of the topic values. Using MAP inference permits determining topic values with reduced computational burden compared to prior schemes such as variational inference or Gibbs sampling.

In some examples, the deviation-determination module 236 can be configured to successively determine layer-specific deviation values associated with individual layers of the multilayer computational graph. The layer-specific deviation values, below denoted $\Delta\Phi_{d,l}$, can be determined according to a second computational order, e.g., a reverse computational order. The second computational order can be different from the first computational order.

In some examples, the layer-specific deviation values can be determined, for a particular document 304, layer by layer of the MCG 302 in the second (e.g., reverse) computational order. Given the MCG 302 with layers 1-L, the layer-specific deviation values can be computed, e.g., using a mirror descent algorithm such as that shown in Table 2. In Table 2, $\theta_{d,l}$ denotes the estimate of the content value at the $l^{th}$ iteration, e.g., determined as in Table 1, line 5. $T_{d,l}$ denotes the step size of the mirror descent, e.g., as discussed above with reference to Table 1, line 3.

TABLE 2

1. $\xi_{d,L} = -(I - \mathbb{1}\theta_{d,L}^T) \cdot U^T \cdot \gamma(y_d - \hat{y}_d)$
2. for $\ell = L, \ldots, 1$ 3. $\xi_{d,\ell-1} = (I - \mathbb{1}\theta_{d,\ell-1}^T)\left\{\frac{\theta_{d,\ell} \odot \xi_{d,\ell}}{\theta_{d,\ell-1}} - T_{d,\ell} \cdot \left[\Phi^T \text{diag}\left(\frac{x_d}{(\Phi\theta_{d,\ell-1})^2}\right)\Phi + \text{diag}\left(\frac{\alpha - \mathbb{1}}{\theta_{d,\ell-1}^2}\right)\right](\theta_{d,\ell} \odot \xi_{d,\ell})\right\}$ 4. $\Delta\Phi_{d,\ell} = T_{d,\ell} \cdot \left\{\frac{x_d}{\Phi\theta_{d,\ell-1}}(\theta_{d,\ell} \odot \xi_{d,\ell})^T - \left[\Phi(\theta_{d,\ell} \odot \xi_{d,l}) \odot \frac{x_d}{(\Phi\theta_{d,\ell-1})^2}\right]\theta_{d,\ell-1}^T\right\}$ 5. next $\ell$ In Table 2, the loop from L down to 1 corresponds to the reverse computational order. $\xi_{d,L}$ is an error signal for layer L. $\Delta\Phi_{d,l}$ is the layer-specific deviation value. The deviation-determination module 236 in the example of Table 2 can determine the layer-specific deviation values based at least in part on the topic value $\theta_{d,l}$, the content values $w_{d,n}$ (via $x_d$ as discussed above with reference to Eq. (1)), and a characteristic value $y_d$ (via $\xi_{d,L}$ as shown in Table 2, line 1) associated with the document 304. U is a C×K matrix of regression coefficients, e.g., mapping distributions of topic values to sets of characteristic values. In some examples, U can be randomly initialized, e.g., by determining each element of U randomly from a Gaussian distribution with zero (or substantially zero) mean and standard deviation 0.01, or about 0.01. $\gamma$ is a hyperparameter corresponding with the variance of the regression. In some examples, $\gamma=1$, or $\gamma \geq 1$. $\gamma$ can be tuned by testing model performance for various values of $\gamma$.

In some examples, the deviation-determination module 236 can be configured to successively determine, according to the reverse computational order, second layer-specific deviation values associated with individual layers of the multilayer computational graph based at least in part on a second topic value associated with the second document 304(2), second content values associated with the second document 304(2), and a second characteristic value associated with the second document 304(2). This can be done, e.g., as described above with reference to Table 2.

In some examples, the adjustment-determination module 238 can be configured to determine a model adjustment value, e.g., one or more model adjustment vector or scalar values, based at least in part on the layer-specific deviation values. In some examples, the adjustment-determination module 238 can be configured to determine model adjustment values for individual documents of a plurality of documents, e.g., for each of two or more documents. In some examples, the model-adjustment value for a particular document d is determined as in Eq. (4):

$$\frac{\partial Q_d}{\partial \Phi} = -\frac{1}{D} \cdot \frac{\beta - 1}{\Phi} + \sum_{\ell=1}^{L} \Delta \Phi_{d,\ell} \quad (4)$$

In Eq. (4), $Q_d$ is a loss or cost function for document d. In an example, $Q_d(U, \Phi) \stackrel{def}{=} -(1/D) \ln p(\Phi|B) - \ln p(y_d|\theta_{d,L}, U, \gamma)$.

In Eq. (4), D is the number of documents. $\beta$ is a hyperparameter corresponding to a smoothing parameter of a Dirichlet distribution of topics in documents. In some examples, $\beta$ can be determined using a validation set, e.g., as described above with reference to hyperparameter $\alpha$. In some examples, $\beta$ can be equal or substantially equal to, e.g., 1.0, 1.0001, 0.5, or 0.1. In some examples, the adjustment-determination module 238 can be configured to determine the model adjustment value further based at least in part on the second layer-specific deviation values.

In some examples, the adjustment-determination module 238 can additionally or alternatively be configured to determine an output adjustment value $\partial Q_d/\partial U$, e.g., one or more output adjustment vector or scalar values, based at least in part on the topic value $\theta_{d,L}$ and the characteristic value $y_d$ of document 304. In some examples, the adjustment-determination module 238 can be configured to determine the output adjustment value further based at least in part on the second topic value and a second characteristic value associated with the second document. In some examples, the adjustment-determination module 238 can be configured to determine output adjustment values for individual documents 304 of a plurality of documents, e.g., for each of two or more documents 304, based at least in part on the determined topic values and the characteristic values associated with those documents 304.

In some examples, the output adjustment value for a particular document d is determined as in Eq. (5):

$$\frac{\partial Q_d}{\partial U} = \begin{cases} -\gamma \cdot (y_d - \hat{y}_d)\theta_{d,L}^T & \text{classification} \\ -\frac{1}{\gamma} \cdot (y_d - \hat{y}_d)\theta_{d,L}^T & \text{regression} \end{cases} \quad (5)$$

in which $\hat{y}_d$ is defined as in Eq. (6):

$$\hat{y}_d = \begin{cases} \text{Softmax}(\gamma \cdot p_{o,d}), & \text{classification} \\ p_{o,d}, & \text{regression} \end{cases} \quad (6)$$

$$= \begin{cases} \text{Softmax}(\gamma \cdot U\theta_{d,L}), & \text{classification} \\ U\theta_{d,L}, & \text{regression} \end{cases}$$

and the Softmax function is defined as in Eq. (7):

$$\text{Softmax}(x)_c = \frac{e^{x_c}}{\sum_{c'=1}^{C} e^{x_{c'}}} \quad (7)$$

for c=1, . . . , C. For example, C=2 for "win"/"loss" examples such as those discussed below.

In some examples, the modification module 240 can be configured to modify one or more parameters, e.g., at least one parameter, of the MCG 302 based at least in part on the model adjustment value (or at least some of the values, if more than one). In some examples, the modification module 240 can be configured to modify one or more parameters of the MCG 302 based at least in part on the output adjustment value (or at least some of the values, if more than one).

In some examples, the training engine 202 can be configured to perform minibatch training of the MCG 302 (or other computational model 232). For example, the training engine 202 can successively select minibatches, i.e., subsets of documents 304(1)-304(D). Each subset can include, e.g., a group including a first document 304 and a second document 304. For individual ones of the minibatches, topic values can be determined for individual documents in the minibatch (topic-determination module 234), layer-specific deviation values can be determined for individual documents in the minibatch (deviation-determination module 236), a model adjustment value can be determined based at least in part on the layer-specific deviation values associated with the first and second documents (adjustment-determination module 238), and the MCG 302 can be modified (modification module 240). Additionally or alternatively, for individual ones of the minibatches, training engine 202 can determine an output adjustment value based at least in part on topic values and characteristic values associated with the documents in the minibatch (adjustment-determination module 238) and the MCG 302 can be modified (modification module 240).

In some examples, minibatch training is carried out, e.g., as shown in Table 3. The operations shown in Table 3 are for one training epoch. Some or all of these operations can be carried out for each of a plurality of training epochs, e.g., until the MCG 302 satisfies selected convergence criteria. Table 3 uses a probability distribution defined in Eq. (8):

$$p(y_d | \theta_{d,L}, U, \gamma) = \begin{cases} N(U\theta_{d,L}, \gamma^{-1}) & \text{regression} \\ \text{Softmax}(\gamma U\theta_{d,L}) & \text{classification} \end{cases} \quad (8)$$

where Softmax(•) is as in Eq. (7). In some examples, $y_d$ is a one-hot multinomial random variable distributed according to $y_d$ as in Eq. (8). That is, in these examples, only one component of $y_d$ has a nonzero value. A draw can be pulled from the distribution p, or the probabilities p of various $y_d$ values can be used directly, or any combination thereof.

more document(s) 304. The documents 304 can include, e.g., documents of a validation set or documents of a test set. For example, the estimation engine 204 can be configured to operate the MCG 302, e.g., as described below, to provide a result characteristic value 308 associated with a test document 304 based at least in part on test content values of

TABLE 3

```
1  for minibatch number t = 1, . . . , T
2    select two or more documents to form the minibatch, 𝒟_t
3    for each document d ∈ 𝒟_t
4      determine topic value θ_{d,L}, e.g., as in Table 1
5      determine characteristic value y_d ~ p(y_d|θ_{d,L}, U, γ), where p(·) is
         as in Eq. (8).
6      determine the model adjustment value ∂ Q_d/∂ Φ as in Eq. (4) and
         Table 2
7      determine the output adjustment value ∂ Q_d/∂ U as in Eq. (5) and
         Table 1
8    next document
9    determine an aggregate output adjustment value:
```

$$\Delta U_t = \frac{1}{|\mathcal{D}_t|} \sum_{d \in \mathcal{D}_t} \left. \frac{\partial Q_d}{\partial U} \right|_{U=U_{t-1}, \Phi=\Phi_{t-1}}$$

```
     where U_{t-1} and Φ_{t-1} denote the estimates of U and Φ up through
     minibatch t − 1
10   determine an aggregate model adjustment value:
```

$$\Delta \Phi_t = \frac{1}{|\mathcal{D}_t|} \sum_{d \in \mathcal{D}_t} \left. \frac{\partial Q_d}{\partial \Phi} \right|_{U=U_{t-1}, \Phi=\Phi_{t-1}}$$

```
11   Modify the MCG 302 based on the aggregate output adjustment value:
                Ut = Ut − 1 − μ_u · ΔU_t
     where μ_u is a selected learning rate for the output adjustment value U,
     indicated by the subscript "u."
12   Modify the MCG 302 based on the aggregate model adjustment value:
13     for each column φ_j of Φ, j = 1, . . . , K:
14           Set the learning rate:
```

$$\mu_{\phi_j} = \mu_0 \left( \sqrt{\frac{1}{t \cdot V} \sum_{\tau=1}^{t} \|\Delta \phi_{j,\tau}\|_2^2} + \epsilon \right)^{-1}$$

```
15           Update the column:
```

$$\phi_{j,t} = \frac{1}{C_{\phi_{j,t}}} \sigma_{j,t-1}$$

$$\sigma_{j,t-1} = \phi_{j,t-1} \odot \exp\left(-\mu_{\phi_j} \cdot \Delta \phi_{j,t}\right)$$

where the $C_{\phi_{j,t}}$ values are selected so that $\sum (\phi_{j,t}) = 1$.

```
16     next column φ_j
17 next minibatch t
```

In some examples, $\partial Q_d/\partial \Phi$ and $\partial Q_d/\partial U$ can be document-specific deviation values. Model adjustment values $\Delta \Phi_t$ or output adjustment values $\Delta U_t$ can then be determined based at least in part on the document-specific deviation values. The learning rate(s) $\mu_u$ can be equal or substantially equal to unity, or can be tuned based on model performance. In some examples, gradient forms, learning rates, or learning-rate adjustments other than those above can be used, e.g., Ada-Grad learning-rate adjustments. For example, $p(y_d|\theta_{d,L}, U, \gamma)$ can be formulated in ways other than those given above in Eq. (8), and lines 5-7 of Table 3 can be modified accordingly. In some examples, $C_{\phi_{j,t}}$ can be computed by first computing the $\sigma_{j,t-1}$ values and then setting $C_{\phi_{j,t}}$ to the sum of the $\sigma_{j,t-1}$ values.

In some examples, a trained model can be used to classify or otherwise determine characteristic values 308 of one or the test document 304. The estimation engine 204 can be configured to provide the result characteristic value, e.g., before or after modifying the modification module 240 modifies one or more parameters of the MCG 302.

In some examples, the topic-determination module 242 of estimation engine 204 can be configured to determine topic values of document 304 based on content values thereof. For example, the topic-determination module 242 can be configured to, for individual documents 304 of one or more documents (e.g., a plurality of documents), operate the layers of the multilayer computational graph according to the forward computational order to determine a set of topic values $\theta_d$ for each individual document 304 based at least in part on a set of content values (e.g., $w_d$ or $x_d$) of that document 304. This can be done, e.g., as discussed above with reference to the topic-determination module 234, e.g., as in Table 1.

In some examples, the classification engine 206 can be configured to determine, for individual documents 304 of the plurality of documents 304, characteristic value(s) 308 $y_d$ of individual documents 304 based at least in part on the topic value(s) for that document 304, e.g., topic value $\theta_{d,L}$ from Table 1, line 5. For example, combining Eq. (7) and Eq. (8), a probability that a particular characteristic value 308 c is representative of or associated with a particular document 304 d can be computed as in Eq. (9):

$$p(y_d = c \mid \theta_{d,L}, U, \gamma) = \frac{\exp(\gamma u_c \theta_{d,L})}{\sum_{c'=1}^{C} \exp(\gamma u_{c'} \theta_{d,L})} \approx p(y_d = c \mid w_{d,1:N}, \Phi, U, \alpha, \gamma) \quad (9)$$

where $c \in 1, \ldots, C$ for C classes, $u_c$ is the $c^{th}$ row of the matrix U, and $\theta_{d,L}$ is, e.g., as determined in Table 1. Also as shown in Eq. (9), the computed probability p is approximately the probability of a given characteristic value 308 c given the N words $w_{d,1:N}$ in document d.

In some examples, for a given document 304 d, a respective p value can be computed for each class $c=1, \ldots, C$. The characteristic value 308 $C_d$ for document d can then be selected from among the computed p values as in Eq. (10):

$$C_d = \underset{c=1,\ldots,C}{\arg\max}\, p(y_d = c \mid \theta_{d,L}, U, \gamma) \quad (10)$$

Based on Eq. (9), Eq. (10) is an approximation of the computation in Eq. (11):

$$C_d = \underset{c=1,\ldots,C}{\arg\max}\, p(y_d = c \mid w_{d,1:N}, \Phi, U, \alpha, \gamma) \quad (11)$$

In some examples, to select more than one characteristic value 308 $C_{d,r}$ for document d, with $r \in 1, \ldots, R$ and $R > 1$ (e.g., R a positive integer), the highest R values of the p function can be selected as the characteristic values 308.

In some examples, the probability-determination module 244 of classification engine 206 can be configured to determine probabilities of respective candidate characteristic values based at least in part on the topic values from the topic-determination module 242. In some examples of classification, the probabilities can correspond to a multinomial distribution. In some examples of regression, the probabilities can correspond to a normal distribution. For example, the probabilities $p(y_d|\theta_{d,L}, U, \gamma)$ can be determined as in Eq. (8), using the $\theta_{d,L}$ values provided by the topic-determination module 242.

In some examples, the selection module 246 can be configured to select, as the one or more characteristic values 308, one or more of the candidate characteristic values having respective probabilities meeting one or more selected criteria. In some examples, the one or more selected criteria can include a requirement that the selected candidate characteristic values be the result of, or based at least in part on, a draw from a probability distribution corresponding to the determined probabilities. In some examples, $y_d \sim p(y_d|\theta_{d,L}, U, \gamma)$, e.g., as discussed above with reference to Table 3, line 5. In some examples, $y_d$ can be a C×1 vector, where C is the number of possible characteristic values 308.

In some examples, the one or more selected criteria can include a requirement that the respective probability exceed a selected threshold. In some examples, the one or more selected criteria can include a requirement that the respective probability be the highest probability of the determined probabilities, e.g., as discussed above with reference to Eq. (10) or Eq. (11). In some examples, the one or more selected criteria can include a requirement that the respective probability be one of the R highest probabilities of the determined probabilities, for an integer R>0, e.g., as discussed above with reference to $C_r$. In some examples, the one or more selected criteria can include any combination of two or more of the above criteria or other criteria.

In some examples, training engine 202 can perform unsupervised learning instead of, or in addition to, the supervised learning described above. Topic-determination module 234 can determine topic-specific layer values $\theta_{d,L}$ as set forth in Table 1, with an independent parameter matrix $\tilde{\Phi}$ used in place of $\Phi$. Deviation-determination module 236 can then determine a document-specific deviation value $\partial R_d / \partial \tilde{\Phi}$, where the loss function $R_d$ is, e.g., as given in Eq. (12):

$$R_d(\tilde{\Phi}) = -\frac{1}{D} \ln p(\tilde{\Phi} \mid \beta) - \ln p(w_{d,1:N} \mid \tilde{\Phi}, \alpha) \quad (12)$$

In some examples, the document-specific deviation value is as in Eq. (13):

$$\frac{\partial R_d}{\partial \tilde{\Phi}} = \left(-\frac{1}{D} \cdot \frac{B-1}{\tilde{\Phi}}\right) - (\ln p(x_d \mid \theta_d, \tilde{\Phi})) \quad (13)$$

where $(B-1)/\tilde{\Phi}$ denotes elementwise division of the scalar $B-1$ by the matrix $\tilde{\Phi}$, and given p as in Eq. (14):

$$p(x_d \mid \theta_d, \tilde{\Phi}) = \prod_{v=1}^{V} \left(\sum_{j=1}^{K} \theta_{d,j} \tilde{\Phi}_{vj}\right)^{x_{d,v}} \quad (14)$$

where $x_{d,v}$ denotes the term frequency of the $v^{th}$ word in the vocabulary A inside the $d^{th}$ document, and $x_d$ denotes the bag-of-words (BoW) vector of the $d^{th}$ document, e.g., as discussed above with reference to Eq. (1).

Deviation-determination module 236 or adjustment-determination module 238 can determine an aggregate deviation value $\Delta \tilde{\Phi}_t$, e.g., based at least in part on document-specific deviation values for multiple documents in a training set or minibatch. This can be done, e.g., as described above with reference to Table 3, line 10, with $\tilde{\Phi}$ used in place of $\Phi$.

Adjustment-determination module 238 can then determine a model adjustment value or an aggregate model adjustment value, e.g., based at least in part on a document-specific deviation value $\partial Q_d / \partial \tilde{\Phi}$ or aggregate deviation value $\Delta \tilde{\Phi}$. Modification module 240 can then update the $\tilde{\Phi}$ matrix of model parameters based at least in part on the model adjustment value or aggregate model adjustment value. This can be done, e.g., as discussed above with reference to Table 3, lines 12-16, with $\tilde{\Phi}$ used in place of $\Phi$.

In some examples, ones of the content values can be ranked based on their role in determining characteristic values of a document. For example, the trained MCG 302 can be used to determine which content values are correlated with particular characteristic values across the training set of one or more documents. This is discussed in more detail below and with reference to FIG. 5. As noted above, content values can be associated with identifying information. In some examples, content values can be ranked without reference to identifying information, or with reference to identifying information. For example, in a key-value store or database table with fields named "Latitude" and "Longitude" content values can be ranked solely on the numeric values in those fields, or can be ranked in a way that distinguishes numeric values of Latitude from equal numeric values of Longitude.

In some examples, the candidate-selection module 248 can be configured to determine a first candidate characteristic value and a second candidate characteristic value, e.g., two y values in the notation above. The content values can then be ranked as described below according to their correlation with the first candidate characteristic value or the second candidate characteristic value. In some examples, the candidate-selection module 248 can receive user input indicating the first or second candidate characteristic values, e.g., via user interface 210, FIG. 2. Additionally or alternatively, the candidate-selection module 248 can cluster the characteristic values associated with documents 304 in a training set used to train the MCG 302 into two clusters based on commonality of characteristic values across documents. The candidate-selection module 248 can then select as the first and second candidate characteristic values the respective characteristic values most representative of each of the clusters (e.g., nearest to the centers of the convex hulls of the clusters in feature space). Additionally or alternatively, the candidate-selection module 248 can select as the first and second candidate characteristic values the two characteristic values most frequently occurring in the training set (e.g., associated with the largest and second largest number of documents).

In some examples, the first candidate characteristic value and the second candidate characteristic value can be mutually exclusive. For example, given documents 304 representing sales calls or sports games, the first candidate characteristic value can indicate a "win," i.e., a sale that resulted from the sales call or a victory over an opposing team, and a second candidate characteristic value can indicate a "loss," i.e., a sales call that did not result in a sale or a defeat by the opposing team. In some examples, the first candidate characteristic value and the second candidate characteristic value can be unrelated or otherwise compatible (e.g., not mutually exclusive). For example, given documents representing weather-sensor data, the first candidate characteristic value can indicate a forecast of cloud cover and the second candidate characteristic value can indicate a forecast of precipitation.

In some examples, the value-selection module 250 can be configured to determine candidate content values of the content values of the documents of the plurality of documents. For example, the value-selection module 250 can select the m content values most frequently occurring in the documents 304 of the training set, where $m \in \mathbb{Z} > 1$. In other examples, each of the content values can be selected (m=M for a total number M of content values in the training set). In examples using m=M, processing in candidate-selection module 248 can be followed by processing in likelihood-determination module 252, as indicated by the stippled arrow.

In some examples, the likelihood-determination module 252 can be configured to determine, for individual ones of the content values, e.g., for individual ones of the candidate content values or individual content values in a group including two or more of the content values, a respective first result likelihood associated with the first candidate characteristic value and a respective second result likelihood associated with the second candidate characteristic value.

Denoting the candidate characteristic values $Z_i$, e.g., $Z_1$ and $Z_2$, the likelihood value for a content value x in the training set can be determined as in Eq. (15):

$$p(x|y=Z_i) \approx p(x|\hat{\theta}_{d|Z_i}, \Phi) \tag{15}$$

where $\hat{\theta}_{d|Z_i}$ is a maximum a posteriori (MAP) estimate of $\theta_d$ given $Z_i$, as in Eq. (16):

$$\hat{\theta}_{d|Z_i} = \underset{\theta \in \mathcal{P}_K}{\arg\max} \,[\ln p(\theta|\alpha) + \ln p(Z_i|\theta, U)] \tag{16}$$

where $\mathcal{P}_K$ is the (K−1)-dimensional probability simplex defined as in Eq. (17):

$$\mathcal{P}_K = \left\{ \theta \in \mathbb{R}^K : \theta_j \geq 0, \sum_{j=1}^{K} \theta_j = 1 \right\} \tag{17}$$

In a classification example, $\hat{\theta}_{d|Z_i}$ can be computed as in Eq. (18):

$$\hat{\theta}_{d|Z_i} = \underset{\theta \in \mathcal{P}_K}{\arg\min} \, [-\gamma \cdot y_d^T U \theta_d + \ln(\mathbb{1}^T \exp(\gamma U \theta_d)) - (\alpha - \mathbb{1})^T \ln \theta_d] \tag{18}$$

In a regression example, $\hat{\theta}_{d|Z_i}$ can be computed as in Eq. (19):

$$\hat{\theta}_{d|Z_i} = \underset{\theta \in \mathcal{P}_K}{\arg\min} \left[ \frac{1}{\gamma} \|y_d - U \theta_d\|_2^2 - (\alpha - \mathbb{1})^T \ln \theta_d \right] \tag{19}$$

Once $\hat{\theta}_{d|Z_i}$ has been computed, $p(x|\hat{\theta}_{d|Z_i}, \Phi)$ can be computed as described above with reference to Eq. (14), with $\hat{\theta}_{d|Z_i}$ in place of $\theta_d$ and $\Phi$ in place of $\hat{\Phi}$.

In some examples, the ranking module 254 can be configured to rank the individual ones of the content values based at least in part on respective comparisons of the respective first result likelihoods with the respective second result likelihoods. For example, the ranking module 254 can be configured to determine the respective comparisons as respective ratios, e.g., log-likelihood ratios, of the respective first result likelihoods and the respective second result likelihoods. For example, a respective comparison can include a ratio of the respective first result likelihood to the respective second result likelihood, or vice versa. The rankings can indicate how strongly the individual ones of the content values are associated with either the first candidate content value or the second candidate content value. In some examples, the comparison can be computed as given in Eq. (20) or Eq. (21).

$$\mathrm{rank}(x) = \frac{p(x|y=Z_1)}{p(x|y=Z_2)} \tag{20}$$

$$\mathrm{rank}(x) = \ln \frac{p(x|y=Z_1)}{p(x|y=Z_2)} \tag{21}$$

In some examples, the arg max used in Eq. (11) to select a characteristic value 308 for a document 132 can also be expressed as the pair-wise decision rule of Eq. (22):

$$u_{cc'}\theta_{d,L} > 0, \forall c' \neq c \quad (22)$$

where $u_{cc'} \overset{\text{def}}{=} u_c - u_{c'}$ and, as in Eq. (9), $u_c$ is the $c^{th}$ row of the matrix U. Therefore, $u_{cc'}$ can be a vector. Eq. (22) can be reformulated as in Eq. (23):

$$\sum_{j=1}^{K} u_{cc',j}\theta_{d,L,j} > 0, \forall c' \neq c \quad (23)$$

where the sum is over the K topics, $u_{cc',j}$ is the $j^{th}$ element of $u_{cc'}$, and $\theta_{d,L,j}$ is the $j^{th}$ element of vector $\theta_{d,L}$. In Eq. (23), a positive value of $u_{cc',j}$ indicates that characteristic value c is more likely than characteristic value c' for topic j. A negative value of $u_{cc',j}$ indicates that characteristic value c' is more likely than characteristic value c for topic j. The values $u_{cc',j}$ are referred to herein as "weight of evidence" values, since they correspond to evidence of correlations between topic values $\theta_{d,L}$ in a document and characteristic values 308 of that document.

Using Eq. (23), a positive weight of evidence can be defined as in Eq. (24):

$$\theta^{+}_{d,cc',j} \overset{\text{def}}{=} \begin{cases} \dfrac{\theta_{d,L,j}}{\sum_{k \in \mathcal{J}_{cc',+}} \theta_{d,L,k}} & u_{cc',j} \geq 0 \\ 0 & \text{otherwise} \end{cases} \quad (24)$$

where $\mathcal{J}_{cc',+}$ is the set of topics k associated with positive $u_{cc',k}$ values. Likewise, a negative weight of evidence can be defined as in Eq. (25):

$$\theta^{-}_{d,cc',j} \overset{\text{def}}{=} \begin{cases} 0 & u_{cc',j} \geq 0 \\ \dfrac{\theta_{d,L,j}}{\sum_{k \in \mathcal{J}_{cc',-}} \theta_{d,L,k}} & \text{otherwise} \end{cases} \quad (25)$$

where $\mathcal{J}_{cc',-}$ is the set of topics k associated with negative $u_{cc',k}$ values.

Given the element-wise positive and negative weights of evidence defined in Eq. (24) and Eq. (25), vector positive and negative weights of evidence can be assembled as in Eq. (26):

$$\theta_{d,cc'}{}^+ = \text{norm}([\theta_{d,cc',1}{}^+, \ldots, \theta_{d,cc',K}{}^+])$$

$$\theta_{d,cc'}{}^- = \text{norm}([\theta_{d,cc',1}{}^-, \ldots, \theta_{d,cc',K}{}^-]) \quad (26)$$

where norm(v) is an operator that normalizes its vector argument v so that the sum of the elements of norm(v) is unity.

The positive and negative weights of evidence can be used to determine how topic values contribute to the determination of characteristic values 308 of a document 304. A score of evidence $\eta_{d,cc',v}$ for a content value v in the vocabulary (v∈1, . . . , V) can be computed as in Eq. (27):

$$\eta_{d,cc',v} \overset{\text{def}}{=} x_{d,v} \ln \left( \frac{\sum_{j=1}^{K} \theta^{+}_{d,cc',j} \Phi_{vj}}{\sum_{j=1}^{K} \theta^{-}_{d,cc',j} \Phi_{vj}} \right) \quad (27)$$

where the summations are over the K topics. In some examples, the likelihood-determination module 252 can determine $\eta_{d,cc',v}$ values, or values of the individual summations in Eq. (27), corresponding to one or more content values v, e.g., the individual content values of the content values as discussed above.

In some examples, the likelihood-determination module 252 can determine the $\eta_{d,cc',v}$ values as in Eq. (27) by comparing the two summations, in the example of Eq. (27) by computing the quotient of the two summations. In some examples, the numerator in Eq. (27) can be a first result likelihood associated with characteristic value c and the denominator in Eq. (27) can be a second result likelihood associated with characteristic value c'.

In some examples, the likelihood-determination module 252 can determine, for individual content values v of the content values, respective log-likelihood ratios, e.g., $\eta_{d,cc',v}$, associated with the first candidate characteristic value c and with the second candidate characteristic value c'.

The scores of evidence can then be accumulated to form a log-likelihood ratio for document d with respect to characteristic values c, c', as in Eq. (28):

$$\eta_{d,cc'} = \sum_{v=1}^{V} x_{d,v} \eta_{d,cc',v} \quad (28)$$

Each term of the summations in Eq. (27) can expresses evidence of content value v's contribution to the log-likelihood ratio of Eq. (28). Accordingly, the content value(s) v having the highest ratio(s) $\eta_{d,cc',v}$ can be selected, e.g., for reporting as content values contributing to the determination of the characteristic value 308 c. In some examples, the ranking module 254 can be configured to rank the individual ones of the content values v with respect to the first candidate characteristic value c and the second candidate characteristic value c' based on the scores of evidence from Eq. (27). In some examples, the ranking module 254 can be configured to rank the individual content values of the content values based at least in part on the respective log-likelihood ratios, e.g., $\eta_{d,cc',v}$ values.

In some examples, respective $\eta_{d,cc'}$ values can be computed for one or more (e.g., a plurality of) second candidate characteristic values 308 c' with reference to a particular first candidate characteristic value 308 c. The first candidate characteristic value c can then be ranked with respect to the one or more second candidate characteristic values c' by sorting the one or more second candidate characteristic values c' in order of the computed $\eta_{d,cc'}$ values, and inserting the first candidate characteristic value c into the sorted list at a position corresponding to an $\eta_{d,cc'}$ value of zero.

Figure 4:
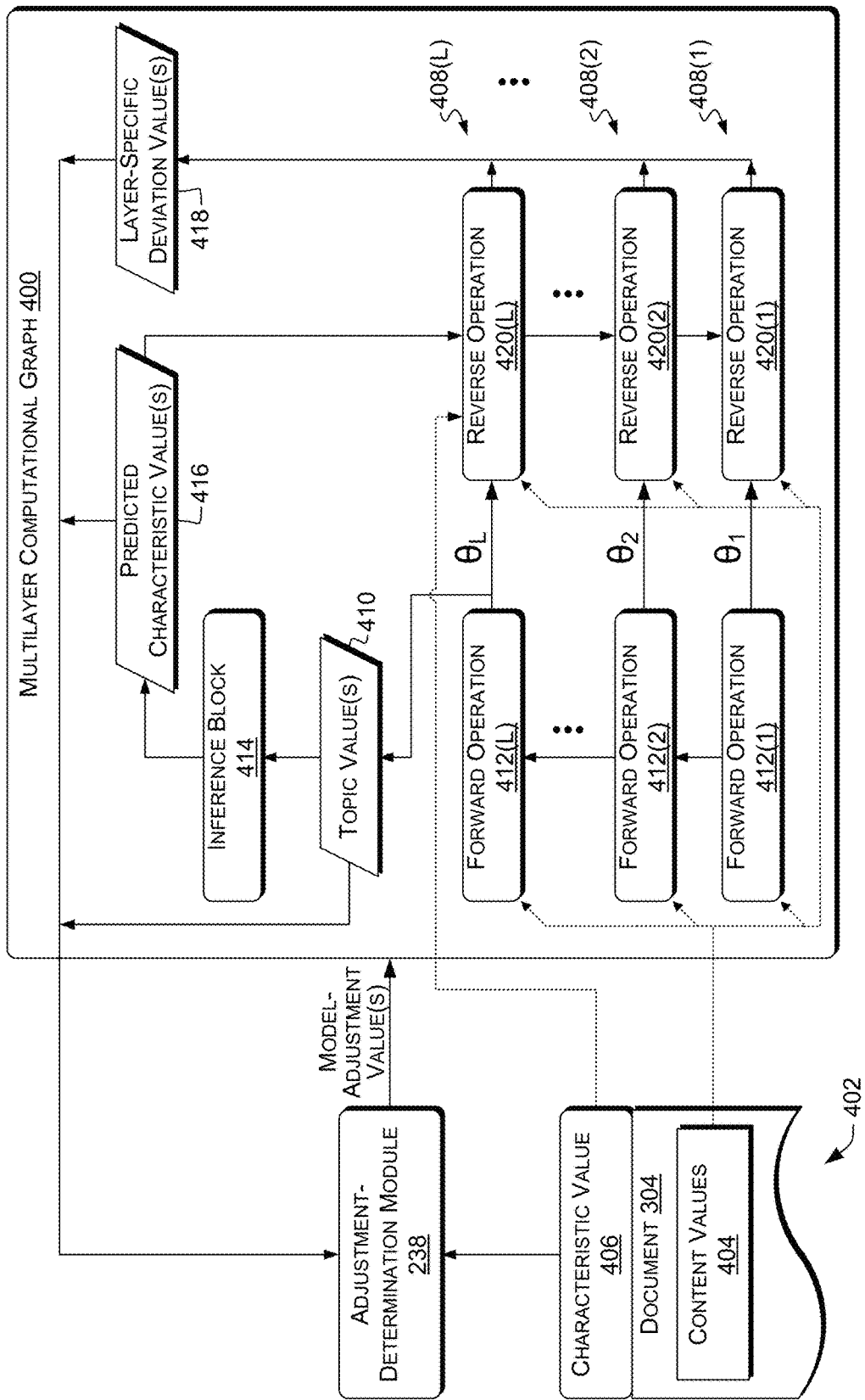
FIG. 4 is an illustration of an example computational model and related components.

FIG. 4 shows an example configuration of an MCG 400, which can represent computational model 126 or 232, examples of related components, and examples of dataflow during training of MCG 400. MCG 400 can be trained using training data set 402 including one or more documents 304. For clarity, only one document 304 is shown. Document 304 includes one or more content values 404 and is associated with one or more characteristic values 406 (for clarity, only one is shown). MCG 400 includes multiple layers 408(1)-408(L) (individually or collectively referred to herein with reference 408), where L is any integer greater than or equal to 1. For clarity, only three layers 408 are shown. In some examples, the MCG 400 includes a fixed number L of layers. In FIG. 4, stippled lines are used solely for clarity of presentation. For clarity of explanation, this figure is described with reference to a multilayer computational graph. However, other types of computational models 126 or 232 can additionally or alternatively be used with techniques described herein.

The topic-determination module 234, FIG. 2, can operate the layers 408 in a forward computational order (up the page in this illustration) to determine topic value(s) 410 associated with document 304. In the illustrated example, respective forward operation blocks 412(1)-412(L) of the layers 408 provide respective layer-specific topic-value outputs $\theta_{d,l}$ for document d and layer l ("$\theta_l$" in FIG. 4). For each layer 408(l), the layer-specific topic value outputs are based at least in part on the content values 404 and the output of the previous layer l–1. The layer-specific topic value outputs can be determined, e.g., as discussed above with reference to Table 1, lines 1 and 5.

In the illustrated example, the layer-specific topic value(s) $\theta_{d,L}$ output by forward operation block 412(L) are topic value(s) 410. The topic value(s) 410 are provided to inference block 414. Inference block 414 determines predicted characteristic value(s) 416 of document 304 based at least in part on the topic value(s) 410 and stored parameters of MCG 400, e.g., regression parameters. The predicted characteristic values 416 can be, e.g., $\hat{y}_d$ as described above with reference to Eq. (6), and the regression parameters can be, e.g., a matrix U dimensioned as the number C of possible characteristic values by the number K of possible topic values.

The deviation-determination module 236, FIG. 2, can operate the layers 408 in a reverse computational order (down the page in this illustration) to determine layer-specific deviation values 418 for the layers 408. In the illustrated example, respective reverse operation blocks 420(1)-420(L) of the layers 408 can provide the layer-specific deviation values 418, which can be denoted $\Delta\Phi_{d,l}$, e.g., as discussed above with reference to Table 2, line 4. The layer-specific deviation values 418 for layer l can be determined, e.g., based at least in part on the layer-specific topic values $\theta_{d,l}$ and $\theta_{d,l-1}$, as discussed above with reference to Table 2, lines 3 and 4. Connections between forward operation blocks 412(l–1) and reverse operation blocks 420(l) are omitted from the illustration for clarity. As shown, the layer-specific deviation values 418 for layer L can further be determined based at least in part on the characteristic value(s) 406 or the predicted characteristic values 416, e.g., as discussed above with reference to Table 2, lines 1 and 3.

The adjustment-determination module 238 can determine model-adjustment value(s) based at least in part on one or more of the topic value(s) 410 ($\theta_{d,L}$), the layer-specific deviation value(s) 418 ($\Delta\Phi_{d,l}$), the predicted characteristic value(s) 416 ($\hat{y}_d$), or the characteristic value 406 ($y_d$). In some examples, the adjustment-determination module 238 can determine a model-adjustment value $\partial Q_d/\partial\Phi$, e.g., as discussed above with reference to Eq. (4). In some examples, the adjustment-determination module 238 can determine an output adjustment value $\partial Q_d/\partial U$, e.g., as discussed above with reference to Eqs. (5), (6), and (7).

In some examples, e.g., using minibatch training, topic value(s) 410 ($\theta_{d,L}$), layer-specific deviation value(s) 418 ($\Delta\Phi_{d,l}$), or predicted characteristic value(s) 416 ($\hat{y}_d$) can be determined for multiple documents d=1 . . . D, or characteristic values 406 ($y_d$) can be received for multiple documents d. In some examples, the adjustment-determination module 238 can determine an aggregate model adjustment value $\Delta\Phi_t$, e.g., as discussed above with reference to Table 3, line 10. In some examples, the adjustment-determination module 238 can determine an aggregate output adjustment value $\Delta U_t$, e.g., as discussed above with reference to Table 3, line 9. The aggregate model adjustment value or the aggregate output adjustment value can be included in the model-adjustment value(s).

In some examples, the modification module 240, FIG. 2, can modify parameters of the computational model according to the model-adjustment value(s) from the adjustment-determination module 238. In some examples, the modification module 240 can update the U matrix of the MCG 400 based at least in part on the output adjustment value or aggregate output adjustment value, e.g., as described above with reference to Table 3, line 11. In some examples, the modification module 240 can update the $\Phi$ matrix of the MCG 400 based at least in part on the model-adjustment value or aggregate model adjustment value, e.g., as described above with reference to Table 3, lines 13-16. In some examples using unsupervised learning, the modification module 240 can update the $\tilde{\Phi}$ matrix of the MCG 400 based at least in part on document-specific deviation value(s), an aggregate deviation value $\Delta\tilde{\Phi}_t$, a model adjustment value, an aggregate model adjustment value, or other values described above with reference to the $\tilde{\Phi}$ matrix of model parameters.

Figure 5:
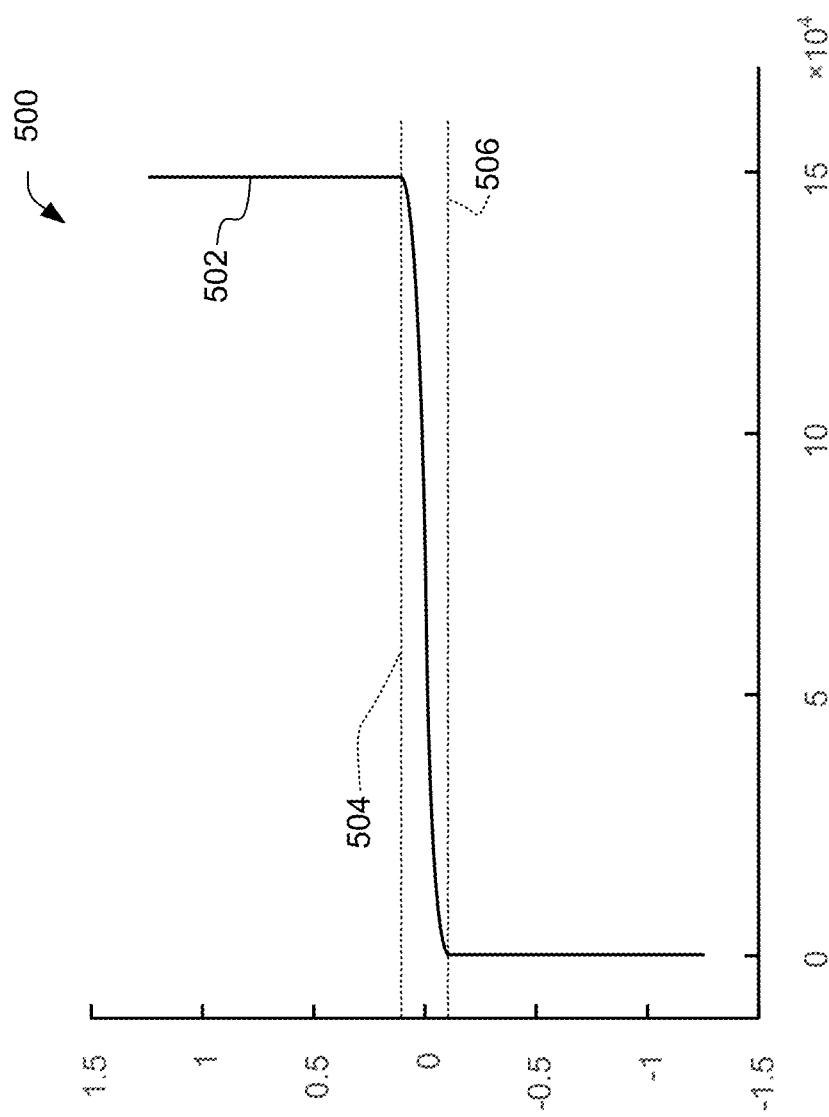
FIG. 5 is a graph showing an example of ranking of candidate content values.

FIG. 5 is a plot 500 showing an example of ranking of candidate content values, e.g., determined by ranking module 254, FIG. 2. In FIG. 5, the abscissa is an index v of the content value in vocabulary A of Eq. (1) and the ordinate is a log-likelihood ratio for two example characteristic values, e.g., "win" and "loss" as described above with reference to candidate-selection module 248, FIG. 2. In the illustrated example, the ranking module 254 has ordered the content values by log-likelihood ratio, e.g., determined according to Eqs. (15)-(21), to determine curve 502. Positive limit 504 and negative limit 506 represent thresholds, e.g., ±0.1, on log-likelihood ratio. In some examples, the ranking module 254 can report individual ones of the content values, e.g., via user interface 210, FIG. 2. In some examples, the ranking module 254 can report individual ones of the content values having log-likelihood values greater than (or not below) positive limit 504, or individual ones of the content values having log-likelihood values less than (or not above) negative limit 506. In some examples, the ranking module 254 can report the highest-ranked $r_1$ ones of the content values, the lowest-ranked $r_2$ ones of the content values, or both, for $r_1, r_2 \in \mathbb{Z} > 0$.

Illustrative Processes

Figure 6:
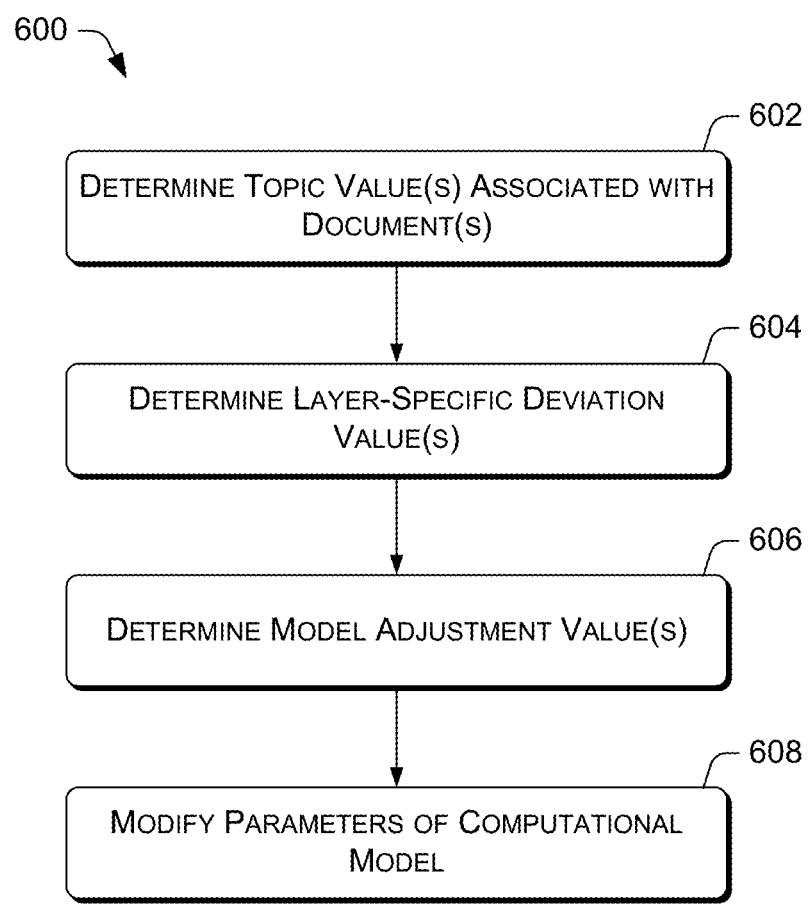
FIG. 6 is a flow diagram that illustrates example processes for training a computational model according to various examples described herein.

FIG. 6 is a flow diagram that illustrates an example process 600 for training a computational model, e.g., a computational model 126 or 232 such as an MCG 302 or 400. Example functions shown in FIG. 6 and other flow diagrams and example processes herein can be implemented on or otherwise embodied in one or more computing device(s) 102 or 104, e.g., a computing device 200, e.g., using software running on such device(s). For the sake of illustration, the example process 600 is described below with reference to processing unit 218 or other components of computing device 200, FIG. 2, or with reference to other components shown in FIGS. 1-4, that can carry out or participate in the steps of the exemplary method. However, other processing unit(s) such as processing unit 112 and/or other components of computing device(s) 102 or 104 can carry out step(s) of described example processes such as process 600. Similarly, exemplary method(s) shown in FIGS. 7 and 8 are also not limited to being carried out by any specifically-identified components.

The order in which the operations are described in each example flow diagram or process is not intended to be construed as a limitation, and any number of the described operations can be combined in any order and/or in parallel to implement each process. As noted above, any of the described operations can be performed on other items in addition to any specifically-identified items or other items in any given group of items. For example, block 606, discussed below, can operate on or be performed using fewer than all the determined topic value(s) or layer-specific deviation value(s).

Figure 7:
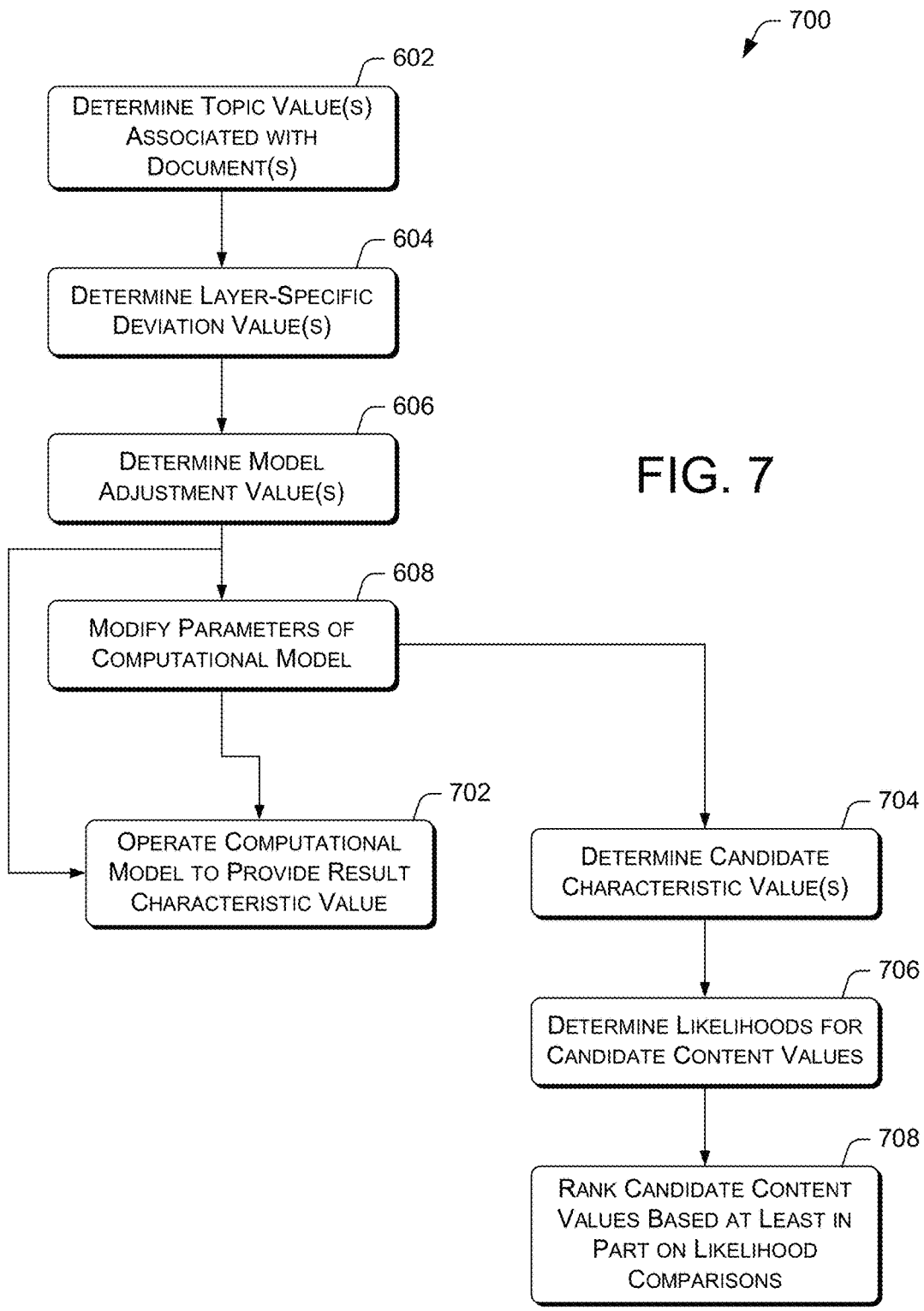
FIG. 7 is a flow diagram that illustrates example processes for training and operating a computational model according to various examples described herein.
Figure 8:
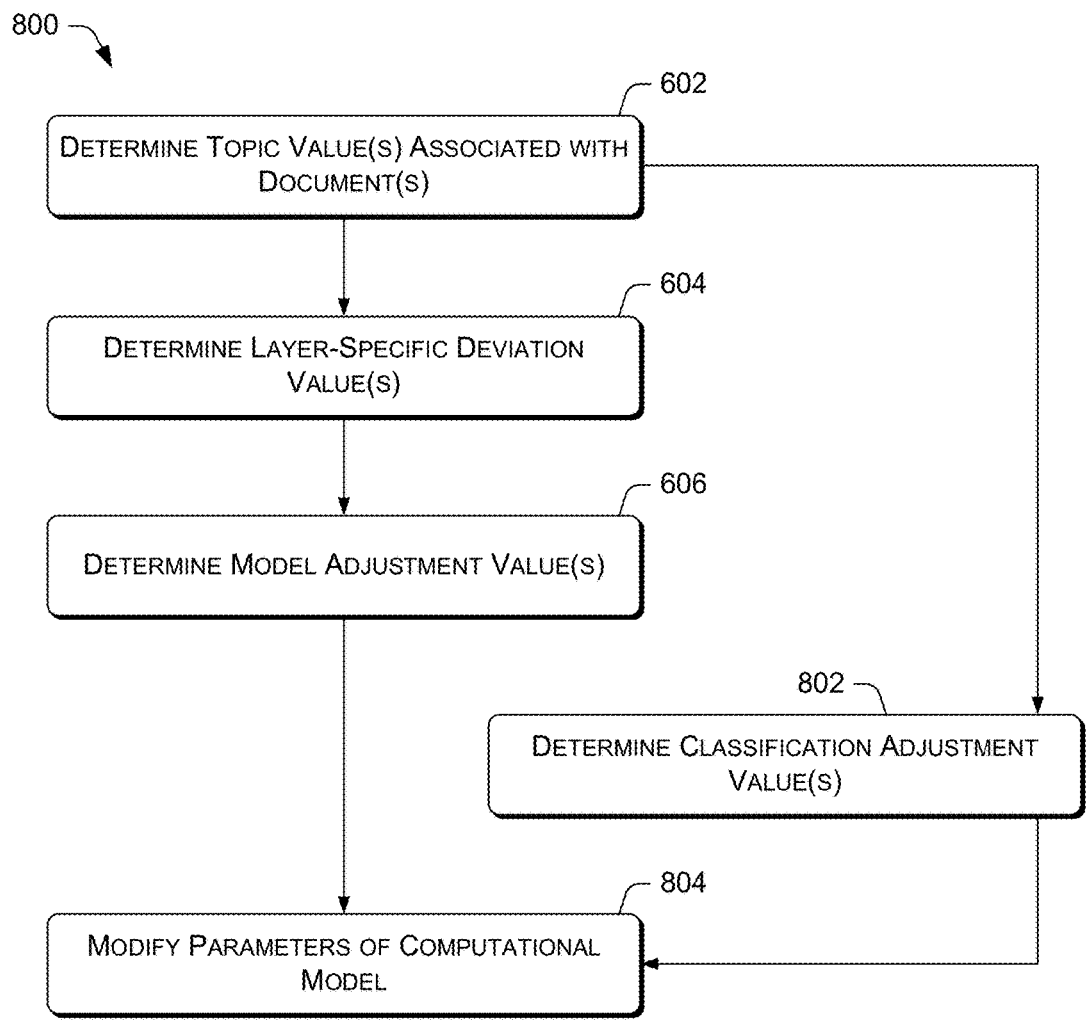
FIG. 8 is a flow diagram that illustrates example processes for training a computational model according to various examples described herein.

Moreover, the operations in each of FIGS. 6, 7, and 8 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 602, layers of a multilayer computational graph can be successively operated according to a forward computational order to determine a topic value or values (e.g., $\theta_d$) associated with a first document of a plurality of documents based at least in part on content values (e.g., $w_{d,n}$ or $x_d$) associated with the first document. Some examples are described above with reference to the topic-determination module 234, FIG. 3. As noted above, topic values can be related to, e.g., user text or other natural-language-processing inputs, or structured data.

In some examples, block 602 can include successively operating the layers of the multilayer computational graph according to the first computational order to determine a second topic value for a second document of the plurality of documents based at least in part on second content values associated with the second document. Block 602 can include determining topic values for any number of documents, e.g., of a training set, minibatch, validation set, or test set.

At block 604, layer-specific deviation values (e.g., $\Delta\Phi_{d,l}$) associated with individual layers of the multilayer computational graph can be successively determined according to a reverse computational order, e.g., using mirror descent. The layer-specific deviation values can be determined based at least in part on the topic value, the content values, and a characteristic value (e.g., $y_d$) associated with the first document. Some examples are described above with reference to the deviation-determination module 236, FIG. 4.

In some examples, block 604 can include successively determining, according to the reverse computational order, second layer-specific deviation values associated with individual layers of the multilayer computational graph based at least in part on the second topic value, second content values associated with the second document, and a second characteristic value associated with the second document. Block 604 can include determining layer-specific deviation values (or document-specific deviation values as described above) for any number of documents, e.g., of a training set, minibatch, validation set, or test set.

At block 606, a model adjustment value or values (e.g., $\partial Q_d/\partial\Phi$) can be determined based at least in part on the layer-specific deviation values. Some examples are described above with reference to the adjustment-determination module 238, FIG. 4. In some examples, block 606 can include determining the model adjustment value further based at least in part on the second layer-specific deviation values. In some examples, the model adjustment value (or document-specific deviation values or adjustment values) can be determined based at least in part on layer-specific deviation values for any number of documents, e.g., as described above with reference to Table 3, line 10.

At block 608, one or more parameters associated with the multilayer computational graph can be modified based at least in part on the model adjustment value. Some examples are described above with reference to the modification module 240, FIG. 3.

In some examples, blocks 602-608 can be performed for each of a plurality of minibatches, e.g., as described above with reference to Table 3. For example, the determining the topic values, the determining the layer-specific deviation values, the determining the second layer-specific deviation values, the determining the model adjustment value based at least in part on the layer-specific deviation values and the second layer-specific deviation values, and the modifying can be performed with respect to multiple groups of a first document and a second document. A group can include two or more documents.

FIG. 7 is a flow diagram that illustrates an example process 700 for training and operating a computational model, e.g., a computational model 126 or 232 such as an MCG 302 or 400. In some examples, block 608 can be followed by block 702 or block 704.

At block 702, e.g., before or after modifying the parameters in block 608, the multilayer computational graph can be operated to provide a result characteristic value associated with a test document based at least in part on test content values associated with the test document. Some examples are described above with reference to the estimation engine 204 and the classification engine 206, FIG. 2.

At block 704, a first candidate characteristic value and a second candidate characteristic value can be determined. Some examples are described above with reference to the candidate-selection module 248, FIG. 3.

At block 706, for individual ones of the content values, a respective first result likelihood associated with the first candidate characteristic value and a respective second result likelihood associated with the second candidate characteristic value can be determined. Some examples are described above with reference to the likelihood-determination module 252, FIG. 3. The individual ones of the content values are referred to herein as candidate content values. The candidate content values can be selected, e.g., as described above with reference to the value-selection module 250, FIG. 3. In some examples, the first result likelihood and the second result likelihood can be the numerator and the denominator, respectively, in Eq. (27). In some examples, at block 706, a log-likelihood ratio can be determined, e.g., as discussed above with reference to values $\eta_{d,cc',v}$ in Eq. (27) and the likelihood-determination module 252.

In some examples, the documents comprise named fields and the individual candidate content values comprise values of the named fields. Some examples are described above with reference to an example weather-forecasting system. The documents in some examples can include named fields for "wind speed," "wind direction," and "temperature." The candidate content values can include, e.g., 5 kt, NNE, and 72° F., respectively. In some examples, the documents comprise free-form user text and the individual candidate content values comprise words or phrases in the free-form user text. Some examples are described above with reference to an examples of online-forum posts.

At block 708, the individual candidate content values (or at least some of them, as noted above) can be ranked based at least in part on respective comparisons of the respective first result likelihoods with the respective second result likelihoods. Some examples are described above with reference to FIG. 5, and with reference to the ranking module 254, FIG. 3. For example, the respective comparisons can be determined as respective ratios or log-likelihood ratios of the respective first result likelihoods and the respective second result likelihoods. The respective ratio can be of the respective first result likelihood to the respective second result likelihood, or vice versa. Eq. (27), above, gives an example of a comparison including computation of a log-likelihood ratio. In some examples, at block 708, individual content values of the content values, e.g., candidate content values v, can be ranked based at least in part on the respective log-likelihood ratios, e.g., values $\eta_{d,cc',v}$ in Eq. (27). For example, the content values can be ranked in ascending or descending order of their $\eta_{d,cc',v}$ values.

FIG. 8 is a flow diagram that illustrates an example process 800 for training a computational model, e.g., a computational model 126 or 232 such as an MCG 302 or 400. Block 802 can be performed, e.g., following block 602, block 604, block 606, or block 608 (FIG. 6). Block 804 can be performed after block 608 (FIG. 6).

At block 802, an output adjustment value (e.g., $\partial Q_d/\partial U$) can be determined based at least in part on the topic value (e.g., $\theta_{d,L}$) and the characteristic value (e.g., $y_d$). Some examples are described above with reference to the adjustment-determination module 238 and Eqs. (5)-(7). Block 802 can include determining aggregate output adjustment values, e.g., for a minibatch or training set. Some examples are described above with reference to Table 3, line 9.

At block 804, one or more parameters associated with the multilayer computational graph can be modified based at least in part on the output adjustment value. Some examples are described above with reference to block 608, FIG. 6, or the modification module 240, FIG. 3. The parameters can be modified based at least in part on output adjustment value(s) for multiple documents, e.g., during minibatch training. At block 804, one or more parameters associated with the multilayer computational graph can be modified based at least in part on the model adjustment value, or based at least in part on the output adjustment value and the model adjustment value. Some examples are described above with reference to Table 3, lines 11-16.

Example Clauses

A: A computer-implemented method, comprising: successively operating layers of a multilayer computational graph according to a forward computational order to determine a topic value associated with a first document of a plurality of documents based at least in part on content values associated with the first document; determining a document-specific deviation value of the multilayer computational graph based at least in part on the topic value and the content values; determining a model adjustment value based at least in part on the document-specific deviation value; and modifying one or more parameters associated with the multilayer computational graph based at least in part on the model adjustment value.

B: A computer-implemented method as recited in paragraph A, further comprising operating the multilayer computational graph to provide a result characteristic value associated with a test document based at least in part on test content values associated with the test document.

C: A computer-implemented method as recited in paragraph A or B, further comprising: successively operating the layers of the multilayer computational graph according to the first computational order to determine a second topic value associated with a second document of the plurality of documents based at least in part on second content values associated with the second document.

D: A computer-implemented method as recited in paragraph C, further comprising: successively determining, according to a reverse computational order, second layer-specific deviation values associated with individual layers of the multilayer computational graph based at least in part on the second topic value, second content values associated with the second document, and a second characteristic value associated with the second document; and determining the model adjustment value further based at least in part on the second layer-specific deviation values.

D: A computer-implemented method as recited in paragraph C or D, further comprising: performing, with respect to multiple groups of a first document and a second document, the determining the topic values, the determining the layer-specific deviation values, the determining the second layer-specific deviation values, the determining the model adjustment value based at least in part on the layer-specific deviation values and the second layer-specific deviation values, and the modifying.

E: A computer-implemented method as recited in any of paragraphs A-D, further comprising: determining a first candidate characteristic value and a second candidate characteristic value; determining, for individual content values of the content values, a respective first result likelihood associated with the first candidate characteristic value and a respective second result likelihood associated with the second candidate characteristic value; and ranking the individual content values of the content values based at least in part on respective comparisons of the respective first result likelihoods with the respective second result likelihoods.

F: A computer-implemented method as recited in paragraph E, wherein the documents comprise named fields and the individual ones of the content values comprise values of the named fields.

G: A computer-implemented method as recited in paragraph E or F, wherein the documents comprise free-form user text and the individual ones of the content values comprise words or phrases in the free-form user text.

H: A computer-implemented method as recited in any of paragraphs E-G, wherein the ranking comprises: determining the respective comparisons as respective log-likelihood ratios of the respective first result likelihoods and the respective second result likelihoods.

I: A computer-implemented method as recited in any of paragraphs A-H, further comprising: successively determining, according to a reverse computational order, layer-specific deviation values associated with individual layers of the multilayer computational graph based at least in part on the topic value, the content values, and a characteristic value associated with the first document; determining a second model adjustment value based at least in part on the layer-specific deviation values; and modifying at least one parameter associated with the multilayer computational graph based at least in part on the second model adjustment value.

J: A computer-implemented method as recited in any of paragraphs A-I, further comprising: determining a first candidate characteristic value and a second candidate characteristic value; determining, for individual content values of the content values, respective log-likelihood ratios associated with the first candidate characteristic value and with the second candidate characteristic value; and ranking the individual content values of the content values based at least in part on the respective log-likelihood ratios.

K: A computer-readable medium, e.g., a computer storage medium, having thereon computer-executable instructions, the computer-executable instructions upon execution configuring a computer to perform operations as recited in any of paragraphs A-J.

L: A device comprising: a processor; and a computer-readable medium, e.g., a computer storage medium, having thereon computer-executable instructions, the computer-executable instructions upon execution by the processor configuring the device to perform operations as recited in any of paragraphs A-J.

M: A system comprising: means for processing; and means for storing having thereon computer-executable instructions, the computer-executable instructions including means to configure the system to carry out a method as recited in any of paragraphs A-J.

N: A computer-implemented method, comprising: successively operating layers of a multilayer computational graph according to a forward computational order to determine a topic value associated with a first document of a plurality of documents based at least in part on content values associated with the first document; successively determining, according to a reverse computational order, layer-specific deviation values associated with individual layers of the multilayer computational graph based at least in part on the topic value, the content values, and a characteristic value associated with the first document; determining a model adjustment value based at least in part on the layer-specific deviation values; and modifying at least one parameter associated with the multilayer computational graph based at least in part on the model adjustment value.

O: A computer-implemented method as recited in paragraph N, further comprising operating the multilayer computational graph to provide a result characteristic value associated with a test document based at least in part on test content values associated with the test document.

P: A computer-implemented method as recited in paragraph N or O, further comprising successively operating the layers of the multilayer computational graph according to the first computational order to determine a second topic value associated with a second document of the plurality of documents based at least in part on second content values associated with the second document; successively determining, according to the reverse computational order, second layer-specific deviation values associated with individual layers of the multilayer computational graph based at least in part on the second topic value, second content values associated with the second document, and a second characteristic value associated with the second document; and determining the model adjustment value further based at least in part on the second layer-specific deviation values.

Q: A computer-implemented method as recited in paragraph P, further comprising: performing, with respect to multiple groups of a first document and a second document, the determining the topic values, the determining the layer-specific deviation values, the determining the second layer-specific deviation values, the determining the model adjustment value based at least in part on the layer-specific deviation values and the second layer-specific deviation values, and the modifying.

R: A computer-implemented method as recited in any of paragraphs N-Q, further comprising: determining a first candidate characteristic value and a second candidate characteristic value; determining, for individual content values of the content values, a respective first result likelihood associated with the first candidate characteristic value and a respective second result likelihood associated with the second candidate characteristic value; and ranking the individual content values of the content values based at least in part on respective comparisons of the respective first result likelihoods with the respective second result likelihoods.

S: A computer-implemented method as recited in paragraph R, wherein the documents comprise named fields and the individual ones of the content values comprise values of the named fields.

T: A computer-implemented method as recited in paragraph R or S, wherein the documents comprise free-form user text and the individual ones of the content values comprise words or phrases in the free-form user text.

U: A computer-implemented method as recited in any of paragraphs R-T, wherein the ranking comprises: determining the respective comparisons as respective log-likelihood ratios of the respective first result likelihoods and the respective second result likelihoods.

V: A computer-implemented method as recited in any of paragraphs N-U, further comprising determining a document-specific deviation value of the multilayer computational graph based at least in part on the topic value and the content values; determining a model adjustment value based at least in part on the document-specific deviation value; and modifying one or more parameters associated with the multilayer computational graph based at least in part on the model adjustment value.

W: A computer-implemented method as recited in any of paragraphs N-V, further comprising: determining a first candidate characteristic value and a second candidate characteristic value; determining, for individual content values of the content values, respective log-likelihood ratios associated with the first candidate characteristic value and with the second candidate characteristic value; and ranking the individual content values of the content values based at least in part on the respective log-likelihood ratios.

X: A computer-readable medium, e.g., a computer storage medium, having thereon computer-executable instructions, the computer-executable instructions upon execution configuring a computer to perform operations as recited in any of paragraphs N-V.

Y: A device comprising: a processor; and a computer-readable medium, e.g., a computer storage medium, having thereon computer-executable instructions, the computer-executable instructions upon execution by the processor configuring the device to perform operations as recited in any of paragraphs N-V.

Z: A system comprising: means for processing; and means for storing having thereon computer-executable instructions, the computer-executable instructions including means to configure the system to carry out a method as recited in any of paragraphs N-V.

AA: A system, comprising: one or more computer-readable media having stored thereon a plurality of modules; and one or more processing units operably coupled to at least one of the computer-readable media, the processing unit adapted to execute modules of the plurality of modules comprising: an estimation engine configured to successively operate layers of a multilayer computational graph according to a forward computational order to determine topic values of a document based at least in part on content values associated with the document; and a classification engine configured to determine one or more characteristic values associated with the document based at least in part on the topic values.

AB: A system as recited in paragraph AA, wherein the classification engine is configured to determine the one or more characteristic values associated with the document by: determining probabilities of respective candidate characteristic values based at least in part on the topic values; and selecting, as the one or more characteristic values, one or more of the candidate characteristic values having respective probabilities meeting one or more selected criteria.

AC: A system as recited in paragraph AB, wherein the one or more selected criteria comprise at least one of: a requirement that the respective probability exceed a selected threshold, a requirement that the respective probability be the highest probability of the determined probabilities, or a requirement that the respective probability be one of the N highest probabilities of the determined probabilities, wherein N is a positive integer.

AD: A system as recited in any of paragraphs AA-AC, wherein: the estimation engine is further configured to operate, for individual documents of one or more documents, the layers of the multilayer computational graph according to the forward computational order to determine a set of topic values associated with each individual document based at least in part on a set of content values of that document; and the classification engine is further configured to determine, for individual documents of the one or more documents, a set of characteristic values of each individual document based at least in part on the set of topic values associated with that document.

AE: A system as recited in paragraph AD, further including a ranking engine configured to: determine a first candidate characteristic value and a second candidate characteristic value; determine candidate content values of the content values associated with the documents of the one or more documents; determine, for individual candidate content values, a respective first result likelihood associated with the first candidate characteristic value and a respective second result likelihood associated with the second candidate characteristic value; and rank the individual candidate content values based at least in part on respective comparisons of the respective first result likelihoods with the respective second result likelihoods.

AF: A system as recited in paragraph AE, wherein the documents comprise named fields and the individual candidate content values comprise values of the named fields.

AG: A system as recited in paragraph AE or AF, wherein the documents comprise free-form user text and the individual candidate content values comprise words or phrases in the free-form user text.

AH: A system as recited in any of paragraphs AA-AG, wherein the multilayer computational graph comprises a fixed number of the layers.

AI: A system as recited in any of paragraphs AA-AH, wherein the estimation engine is further configured to determine a document-specific deviation value of the multilayer computational graph based at least in part on the topic values and the content values; determine a model adjustment value based at least in part on the document-specific deviation value; and modify one or more parameters associated with the multilayer computational graph based at least in part on the model adjustment value.

AJ: A system as recited in any of paragraphs AA-AI, further comprising a ranking engine configured to: determine a first candidate characteristic value and a second candidate characteristic value; determine, for individual content values of the content values, respective log-likelihood ratios associated with the first candidate characteristic value and with the second candidate characteristic value; and rank the individual content values of the content values based at least in part on the respective log-likelihood ratios.

AK: A computer-readable medium having thereon computer-executable instructions, the computer-executable instructions upon execution to configure a computer to perform operations comprising: successively operating layers of a multilayer computational graph according to a first computational order to determine a topic value associated with a document based at least in part on content values associated with the document; successively determining, according to a second, different computational order, layer-specific deviation values for individual layers of the multilayer computational graph based at least in part on the topic value, the content values, and a characteristic value associated with the document; determining a model adjustment value based at least in part on the layer-specific deviation values; and modifying one or more parameters associated with the multilayer computational graph based at least in part on the model adjustment value.

AL: A computer-readable medium as recited in paragraph AK, the operations further comprising: successively operating the layers of the multilayer computational graph according to the first computational order to determine a second topic value associated with a second document based at least in part on second content values associated with the second document; successively determining, according to a reverse computational order, second layer-specific deviation values for the individual layers of the multilayer computational graph based at least in part on the second topic value, the second content values, and a second characteristic value associated with the second document; and determining the model adjustment value further based at least in part on the second layer-specific deviation values.

AM: A computer-readable medium as recited in paragraph AK or AL, the operations further comprising: determining an output adjustment value based at least in part on the topic value and the characteristic value; and modifying one or more parameters associated with the multilayer computational graph further based at least in part on the output adjustment value.

AN: A computer-readable medium as recited in paragraph AM, the operations further comprising: successively operating the layers of the multilayer computational graph according to the first computational order to determine a second topic value associated with a second document based at least in part on second content values associated with the second document; determining a second output adjustment value based at least in part on the second topic value and a second characteristic value associated with the second document; and modifying the one or more parameters associated with the multilayer computational graph further based at least in part on the second output adjustment value.

AO: A computer-readable medium as recited in any of paragraphs AK-AN, the operations further comprising: determining a document-specific deviation value of the multilayer computational graph based at least in part on the topic value and the content values; determining a second model adjustment value based at least in part on the document-specific deviation value; and modifying one or more parameters associated with the multilayer computational graph based at least in part on the second model adjustment value.

AP: A computer-readable medium as recited in any of paragraphs AK-AO, the operations further comprising: determining a first candidate characteristic value and a second candidate characteristic value; determining, for individual content values of the content values, respective log-likelihood ratios associated with the first candidate characteristic value and with the second candidate characteristic value; and ranking the individual content values of the content values based at least in part on the respective log-likelihood ratios.

CONCLUSION

Various MCG training and operation techniques described herein can permit more efficiently analyzing data, e.g., to classify documents. Various examples can both classify documents and determine which content values in those documents are correlated with particular content values, reducing memory requirements and computational load compared to maintaining two separate models for those tasks.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, or 200, such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
   successively operating layers of a multilayer computational graph according to a forward computational order to determine a topic value associated with a first document of a plurality of documents based at least in part on content values associated with the first document;
   successively determining, according to a reverse computational order, layer-specific deviation values associated with individual layers of the multilayer computational graph based at least in part on the topic value, the content values, and a characteristic value associated with the first document;
   determining a model adjustment value based at least in part on the layer-specific deviation values;
   modifying at least one parameter associated with the multilayer computational graph based at least in part on the model adjustment value;
   determining a first candidate characteristic value and a second candidate characteristic value;
   determining, for individual content values of the content values, a respective first result likelihood associated with the first candidate characteristic value and a respective second result likelihood associated with the second candidate characteristic value; and
   ranking the individual content values of the content values based at least in part on respective comparisons of the respective first result likelihoods with the respective second result likelihoods.

2. A computer-implemented method as recited in claim 1, further comprising operating the multilayer computational graph to provide a result characteristic value associated with a test document based at least in part on test content values associated with the test document.

3. A computer-implemented method as recited in claim 1, further comprising successively operating the layers of the multilayer computational graph according to the first computational order to determine a second topic value associated with a second document of the plurality of documents based at least in part on second content values associated with the second document;
   successively determining, according to the reverse computational order, second layer-specific deviation values associated with individual layers of the multilayer computational graph based at least in part on the second topic value, second content values associated with the second document, and a second characteristic value associated with the second document; and
   determining the model adjustment value further based at least in part on the second layer-specific deviation values.

4. A computer-implemented method as recited in claim 3, further comprising:

performing, with respect to multiple groups of a first document and a second document, the determining the topic values, the determining the layer-specific deviation values, the determining the second layer-specific deviation values, the determining the model adjustment value based at least in part on the layer-specific deviation values and the second layer-specific deviation values, and the modifying.

5. A computer-implemented method as recited in claim 1, wherein the documents comprise named fields and the individual ones of the content values comprise values of the named fields.

6. A computer-implemented method as recited in claim 1, wherein the documents comprise free-form user text and the individual ones of the content values comprise words or phrases in the free-form user text.

7. A computer-implemented method as recited in claim 1, wherein the ranking comprises: determining the respective comparisons as respective log-likelihood ratios of the respective first result likelihoods and the respective second result likelihoods.

8. A system, comprising:

one or more computer-readable media having stored thereon a plurality of modules; and one or more processing units operably coupled to at least one of the computer-readable media, the one or more processing units adapted to execute modules of the plurality of modules comprising:

an estimation engine configured to successively operate layers of a multilayer computational graph according to a forward computational order to determine topic values of a document based at least in part on content values associated with the document;

a classification engine configured to determine one or more characteristic values associated with the document based at least in part on the topic values, wherein:

the estimation engine is further configured to operate, for individual documents of one or more documents, the layers of the multilayer computational graph according to the forward computational order to determine a set of topic values associated with each individual document based at least in part on a set of content values of that document; and the classification engine is further configured to determine, for individual documents of the one or more documents, a set of characteristic values of each individual document based at least in part on the set of topic values associated with that document; and a ranking engine configured to:

determine a first candidate characteristic value and a second candidate characteristic value;

determine candidate content values of the content values associated with the documents of the one or more documents;

determine, for individual candidate content values, a respective first result likelihood associated with the first candidate characteristic value and a respective second result likelihood associated with the second candidate characteristic value; and rank the individual candidate content values based at least in part on respective comparisons of the respective first result likelihoods with the respective second result likelihoods.

9. A system as recited in claim 8, wherein the classification engine is configured to determine the one or more characteristic values associated with the document by:

determining probabilities of respective candidate characteristic values based at least in part on the topic values; and selecting, as the one or more characteristic values, one or more of the candidate characteristic values having respective probabilities meeting one or more selected criteria.

10. A system as recited in claim 9, wherein the one or more selected criteria comprise at least one of:

a requirement that the respective probability exceed a selected threshold, a requirement that the respective probability be the highest probability of the determined probabilities, or a requirement that the respective probability be one of the N highest probabilities of the determined probabilities, wherein N is a positive integer.

11. A system as recited in claim 8, wherein the documents comprise named fields and the individual candidate content values comprise values of the named fields.

12. A system as recited in claim 8, wherein the documents comprise free-form user text and the individual candidate content values comprise words or phrases in the free-form user text.

13. A system as recited in claim 8, wherein the multilayer computational graph comprises a fixed number of the layers.

14. A computer-readable medium having thereon computer-executable instructions, the computer-executable instructions upon execution to configure a computer to perform operations comprising:

successively operating layers of a multilayer computational graph according to a first computational order to determine a topic value associated with a document based at least in part on content values associated with the document;

successively determining, according to a second, different computational order, layer-specific deviation values associated with individual layers of the multilayer computational graph based at least in part on the topic value, the content values, and a characteristic value associated with the document;

determining a model adjustment value based at least in part on the layer-specific deviation values;

modifying one or more parameters associated with the multilayer computational graph based at least in part on the model adjustment value;

determining a first candidate characteristic value and a second candidate characteristic value;

determining, for individual content values of the content values, a respective first result likelihood associated with the first candidate characteristic value and a respective second result likelihood associated with the second candidate characteristic value; and ranking the individual content values of the content values based at least in part on respective comparisons of the respective first result likelihoods with the respective second result likelihoods.

15. A computer-readable medium as recited in claim 14, the operations further comprising:

successively operating the layers of the multilayer computational graph according to the first computational order to determine a second topic value associated with a second document based at least in part on second content values associated with the second document;

successively determining, according to a reverse computational order, second layer-specific deviation values associated with the individual layers of the multilayer computational graph based at least in part on the second topic value, the second content values, and a second characteristic value associated with the second document; and determining the model adjustment value further based at least in part on the second layer-specific deviation values.

16. A computer-readable medium as recited in claim 14, the operations further comprising:

determining an output adjustment value based at least in part on the topic value and the characteristic value; and modifying one or more parameters associated with the multilayer computational graph further based at least in part on the output adjustment value.

17. A computer-readable medium as recited in claim 16, the operations further comprising:

successively operating the layers of the multilayer computational graph according to the first computational order to determine a second topic value associated with a second document based at least in part on second content values associated with the second document;

determining a second output adjustment value based at least in part on the second topic value and a second characteristic value associated with the second document; and modifying the one or more parameters associated with the multilayer computational graph further based at least in part on the second output adjustment value.

* * * * *